United States Patent [19]

Muramatsu et al.

[11] Patent Number: 5,239,332
[45] Date of Patent: Aug. 24, 1993

[54] AUTOMATIC FOCUSING DEVICE OF CAMERA FOR MOVING OBJECT PHOTOGRAPHY

[75] Inventors: Masaru Muramatsu; Akira Ogasawara, both of Kawasaki, Japan

[73] Assignee: Nikon Corporation, Tokyo, Japan

[21] Appl. No.: 734,208

[22] Filed: Jul. 22, 1991

[30] Foreign Application Priority Data

Jul. 24, 1990 [JP] Japan .................................. 2-195503
Sep. 25, 1990 [JP] Japan .................................. 2-256677

[51] Int. Cl.$^5$ ............................................. G03B 13/36
[52] U.S. Cl. ....................................................... 354/402
[58] Field of Search ............... 354/402, 406, 407, 408; 250/201.8

[56] References Cited

U.S. PATENT DOCUMENTS

| | | | |
|---|---|---|---|
| 4,762,986 | 8/1988 | Suda et al. | 250/201 |
| 4,783,677 | 11/1988 | Hamada et al. | 354/402 |
| 4,873,543 | 10/1989 | Matsuzaki et al. | 354/402 |
| 4,967,224 | 10/1990 | Hamada et al. | 354/402 |
| 4,980,715 | 12/1990 | Utagawa | 354/402 |
| 4,988,856 | 1/1991 | Hamada et al. | 250/201.8 |
| 5,040,015 | 8/1991 | Hamada et al. | 354/402 |
| 5,060,002 | 10/1991 | Ohnuki et al. | 354/402 |

FOREIGN PATENT DOCUMENTS 62-253107 11/1987 Japan .

*Primary Examiner*—W. B. Perkey
*Attorney, Agent, or Firm*—Shapiro and Shapiro

[57] ABSTRACT

There is provided an automatic focusing device of a camera which accurately adjusts focus in a short time on the basis of recent and past information created in accordance with a focused object. The position of the object is predicted on the basis of the recent information and past information calculated at predetermined time intervals. It is therefore possible to accurately predict the position of the object in a short calculation time and to reliably determine whether the object is at rest or in motion. During a servo operation, a tracking servo operation does not begin erroneously for an object at rest. Once the tracking servo operation begins, because of hysteresis for determining whether the object is moving, the lens continuously and stably tracks the object. During the tracking servo operation, there is no delay of the time intervals at which the distance between the lens and the object is measured, and a distance moved by the object can be corrected and automatically adjusted. The lens can thus be moved smoothly in response to the movement of the object.

26 Claims, 17 Drawing Sheets

AUTOMATIC FOCUSING DEVICE OF CAMERA FOR MOVING OBJECT PHOTOGRAPHY

BACKGROUND OF THE INVENTION

1. Field of the Invention

The present invention relates to an automatic focusing device of a camera which accurately adjusts focus in a short time on the basis of recent information and any piece of past information of intermittently calculated focus detecting information created in accordance with a focused object.

2. Related Background Art

Automatic focusing devices have hitherto been known in which the position of an object is predicted on the basis of recent and previous information of intermittently calculated focus detecting information on the distance between a photographic lens and the object. The lens is driven in accordance with the predicted position.

Because the focus detector makes an allowance for error, when the position of the object is predicted on the basis of recent and previous information, error in detecting focus is amplified, thus causing a deviation between the predicted and actual positions of the object.

To minimize the effect caused by such error, automatic focusing devices of cameras have been proposed in which all information on the detection of focus is statistically processed to predict the position of an object in motion.

Such an automatic focusing device, however, has a drawback in that a complicated calculation process is required for the statistical process, thus prolonging time for calculation.

SUMMARY OF THE INVENTION

An object of this invention is to provide an automatic focusing device of a camera in which a simple calculation process is performed in a short time to accurately predict the position of an object in motion.

Another object of the invention is to provide an overlap type automatic focusing device which permits a novel tracking servomechanism using an overlap system, a system of determining whether an object is moving, and a release control.

According to this invention, the position of an object is predicted on the basis of the recent information and any one piece of past information, which is at least two times older than the recent information. These two types of information are selected from the focus detecting information calculated at predetermined time intervals. It is therefore possible to accurately predict the position of the object in a short calculation time.

Also, in the automatic focusing device of a camera according to the invention, past focus detecting information to be selected for predicting the position of the object is determined in accordance with the result of a photographic plane measured. In addition to the above advantage, it is thus possible to accurately predict the position of the object regardless of the luminance of the photographic plane.

According to the present invention, during an overlap servo operation, it is possible to reliably determine whether the object is moving. Therefore, during the servo operation, the tracking servo operation does not begin erroneously for an object at rest. Once the tracking servo operation begins, because of hysteresis for determining whether the object is moving, the lens continuously and stably tracks the object. During the tracking servo operation, there is no delay of the time intervals at which the distance is measured, and the amount of movement made by the object can be automatically corrected and adjusted. The lens can be driven smoothly in response to the movement of the object.

Moreover, time for permitting a release operation is not restricted, and the release operation is permitted at any time. Therefore, the user will not miss a good opportunity for taking photographs. After the release operation, the amount of movement made by the object until the time of exposure is calculated, and the lens is driven accordingly so that it is focused at the time of exposure. The automatic focusing device therefore enables the user to handle his camera with as much ease as when he takes a photograph of an object at rest.

The overlap servo system is not simply applied to tracking the object. When the amount of correction added to a recent amount of defocus is calculated, the amount the lens is driven while the charge of a photoelectric conversion element is accumulated, is intentionally disregarded. The lens can thus be brought into focus.

BRIEF DESCRIPTION OF THE DRAWINGS

FIGS. 6A and 6B are views showing the structure of the overlap type automatic focusing device;

FIGS. 7, 8A and 8B are flowcharts showing steps for the overlap type automatic focusing device;

FIGS. 9 through 12 are diagrams illustrating how an overlap servo operation tracks a moving object;

FIGS. 13 and 14 are flowcharts showing another embodiment in which a determination is made whether an object is moving;

DETAILED DESCRIPTION OF THE PREFERRED EMBODIMENTS

There has previously been proposed in U.S. Ser. No. 439,801, abandoned in favor of Ser. No. 833,821, filed Feb. 12, 1992, now U.S. Pat. No. 5,153,630 issued Oct. 6, 1992, a control method based on an AF servo system, that is, a so-called "overlap servo" control method which utilizes a charge accumulating type photoelectric element (AF sensor). In this method, the period during which the charge of the AF sensor is accumulated and the period during which a servo operation (called AF servo operation) is performed are overlapped with each other with respect to a position where a photographic lens (hereinafter called simply a lens) is focused. Thus, the servo operation time is shortened and accuracy of this operation improves. An AF servo technique has been proposed in recent years which detects an object at rest and in motion, and automatically adjusts the focus while this technique predicts the position of a moving object. A part of this technique has been realized.

The present invention relates to a method of applying the overlap servo control method to an object in motion.

Figure 15:
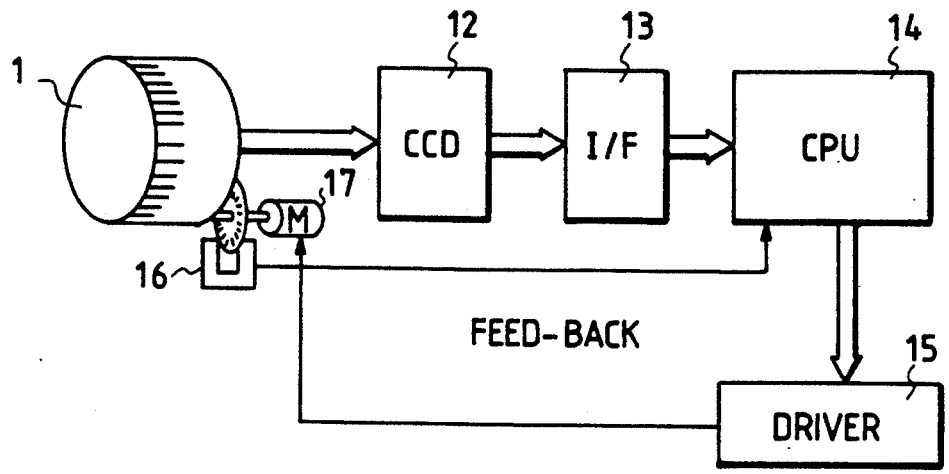
FIG. 15 is a view showing the entire structure of the automatic focusing device.

FIG. 15 is a block diagram showing an automatic focusing device in which a motor drives the lens to automatically adjust its focus.

In FIG. 15, a focus detecting luminous flux transmitted through the lens 1 is formed into an image on a charge accumulating type photoelectric conversion element 12 (hereinafter referred to simply as a photoelectric element 12), such as a CCD, provided in a camera body. A photo image signal is sent from the photoelectric element 12 through an interface 13 to a controller (hereinafter called a CPU) composed of a micro processor controlling an entire system.

A photo image pattern of the focus detecting luminous flux projected onto the photoelectric element 12 is converted by the interface 13 from an analog form to a digital form, being output to the CPU 14, or it is amplified to an appropriate signal level and is directly converted from the analog form to the digital form by an AD converter built in the CPU 14. In accordance with predetermined algorithm, the CPU 14 processes the photo image pattern thus converted into a digital signal to calculate the amount of so-called defocus. Based on this amount, the CPU 14 calculates the amount required for the lens to move in order to bring the object into focus. In this embodiment, specific optical principles and algorithms for detecting the amount of defocus are already well known, and an explanation thereof is omitted.

The lens 1 is provided with an encoder 16 which monitors the movement of the lens 1. The encoder 16 generates pulses every time the lens 1 moves at a fixed distance along an optical axis. The CPU 14 feeds the calculated amount of movement made by the lens 1 to a motor driver 15, which drives a servo motor 17. The servo motor 17 in turn drives the lens 1 in a direction in which the lens 1 is focused. The CPU 14 monitors the movement of the lens 1 on the basis of feedback pulses sent from the encoder 16. When the number of pulses counted by the CPU 14 corresponds to a defocus amount, the motor 17 driving the lens 1 stops its operation. Typically, the encoder 16 is composed of a photo interrupter attached to the rotation shaft of the motor 17 or a portion of a reduction gear, and detects the rotation of the motor 17 driving the lens 1.

Figure 16:
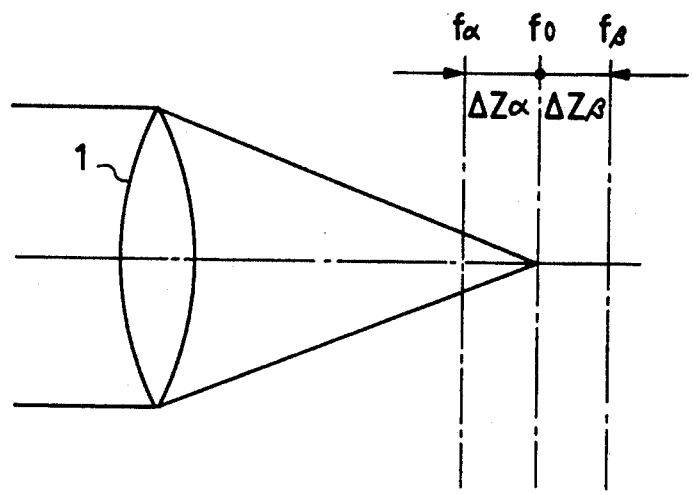
FIG. 16 is a view illustrating defocus.

FIG. 16 is a view illustrating the defocus amount detected by the automatic focusing device.

In this embodiment, the defocus amount is expressed not only by the amount of deviation of a surface (an image-forming surface), onto which the focus detecting luminous flux transmitted through the lens 1 is formed into an image, from a film surface (a predicted surface), but also by a direction in which the image-forming surface deviates from the predicted surface.

Figure 17:
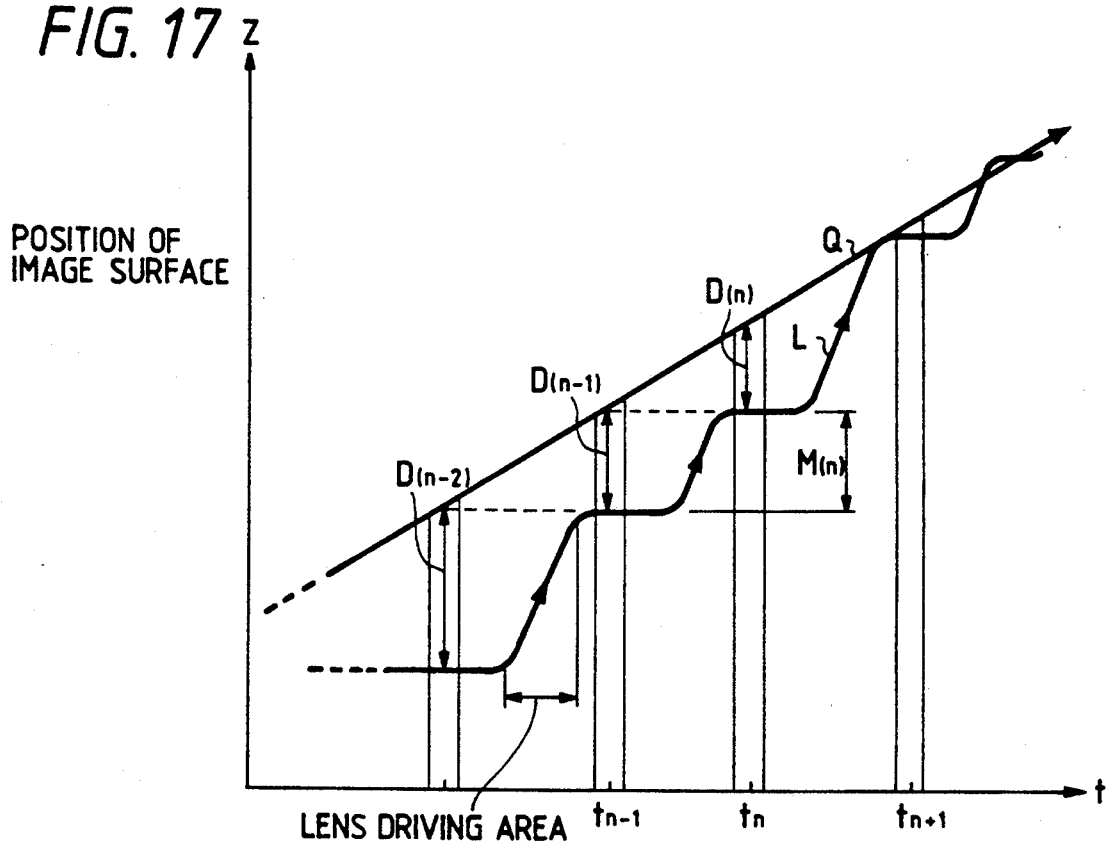
FIGS. 17 through 21 are diagrams illustrating how a discrete servo operation tracks a moving object.

FIG. 17 shows an example in which the automatic focusing device shown in FIG. 15 is used to perform a tracking servo operation for an object in motion.

In FIG. 17, the abscissa axis indicates time, while the ordinate axis indicates the position of the image surface of the object (hereinafter simply called the surface of the object). A line denoted by Q indicates how the position where the object is formed into an image moves as the object moves. This line is called a moving curve of the surface of the object. A line denoted by L indicates the position of the image surface while the lens is moving to focus the object. This line is referred to as a moving curve of the image surface or a moving curve of the image surface of the lens. Therefore, a difference between the lines Q and L shows the defocus amount. Symbols, such as tn and tn−1, indicate the time when the charge of the photoelectric element is halfway accumulated. A duration between two vertical lines drawn up to either line Q or L is a duration during which the charge of the element is accumulated. Hereinafter, in other drawings, the abscissa and ordinate axes, the lines Q and L, have the same meanings as those described above. For example, the amounts of defocus at times tn−1 and tn are expressed by D(n−1) and D(n), respectively.

Tracking servo control method

FIG. 17 shows an example in which the tracking servo control method is employed for a moving object.

The AF servo method is a method in which the distance between the lens and the object is measured (focus is detected) and the lens is driven accordingly. The measurement of the distance and the movement of the lens are repeated alternately. This servo method is hereinafter referred to as a "discrete servo". In this embodiment, the term "distance measurement" is used to include the accumulation of the charge of the photoelectric element, the calculation of the defocus amount based on a focus detecting signal from the photoelectric element, and the calculation of the amount of movement made by the lens based on the calculated defocus amount.

In FIG. 17, portions where the line L rises and the position of the image surface changes indicate periods during which the lens is being driven. If the object is in motion, the position where the object is formed into the image also changes as time passes as indicated by line Q. Therefore, even if the distance is measured after the defocus amount D(n−1) obtained from the distance measured at time tn−1 has been automatically adjusted, the defocus amount D(n) is still detected at time tn. As is obvious from FIG. 17, in the discrete servo, the defocus amount D(n) at time tn is such amount because the object moves from time tn−1 to time tn. If the object is at rest and accuracy in measuring the distance and of servo is high, D(n) does not substantially differ from D(n−1). It is therefore assumed that D(n) differs appreciably from D(n−1) because the object is moving.

If an interval t(n)−t(n−1) during which the distance is measured is substantially the same every time the distance is measured, and if the speed (the inclination of Q) at which the surface of the object moves (hereinafter called the image surface speed of the object) is also the same, the defocus amount D(n) remains substantially the same. If a determination is made that the object is in motion, the movement of the object is predicted. The amount of correction is added to the original defocus amount D(n) so that the defocus amount when the distance is again measured is automatically adjusted to become zero. If a determination is first made that the object is in motion when the distance is measured at time tn in FIG. 17, the amount of movement made by the lens assumes 2D(n) in order to make the defocus amount zero when the distance is measured next time. This is because the amount of correction (hereinafter expressed as C(n)) to be added to the original defocus amount D(n), that is, a predicted amount of movement made by the object until the time when the distance is measured again (the time when focus is detected again) tn+1, also becomes D(n).

Figure 18:
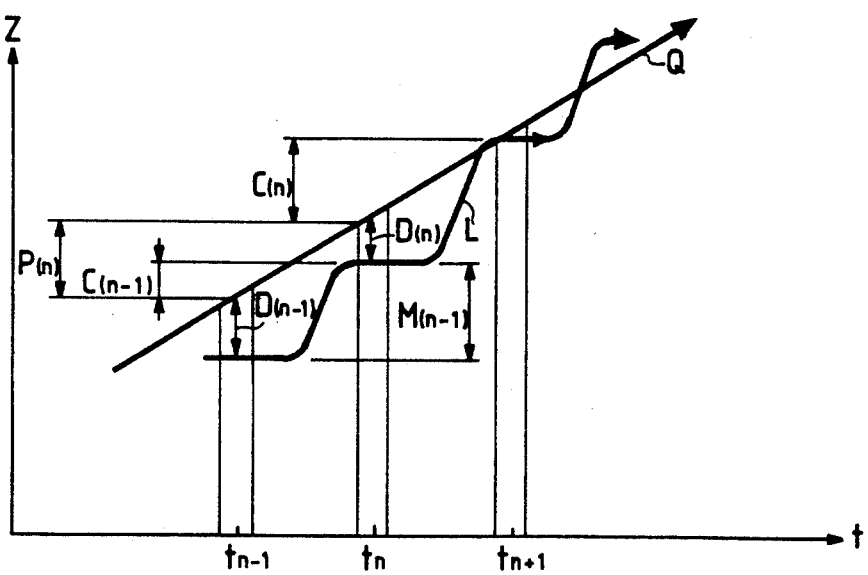

The above description suffices for the first amount of correction. FIG. 18 is a diagram generally showing how the subsequent amount of correction is calculated.

FIG. 18 shows the state in which the movement of the object is already detected, and the amount of correction C(n) in consideration of the image surface speed of the object is added to the original defocus amount, so that the defocus amount is automatically adjusted to become zero when the distance is measured again.

As shown in FIG. 18, if the amount of correction C(n−1) is added to the original defocus amount, which is the result of the distance measured at time tn−1, in order to automatically adjust the lens, then the charge of the photoelectric element is not accumulated again until the automatic adjustment of the lens is completed in the discrete servo. For this reason, the following equation is established:

$$M(n-1)=D(n-1)+C(n-1) \qquad (1)$$

where M(n−1) is the amount of movement made actually by the image surface of the lens (hereinafter called simply the surface of the lens) between times tn−1 and tn until the charge of the photoelectric element is accumulated.

From the defocus amount D(n) obtained on the basis of the distance measured at time tn, the defocus amount D(n−1) at time tn−1, and the amount of movement M(n−1) made by the image surface, the amount of movement P(n) made by a surface on which the object is formed into the image (hereinafter called an image-forming surface of the object) is expressed as follows:

$$P(n)=D(n)+M(n-1)-D(n-1)=D(n)+C(n-1) \qquad (2)$$

From equation (2), the image surface speed S(n) of the object is given as follows:

$$S(n)=P(n)/(tn-tn-1) \qquad (3)$$

It is predicted that a duration between time tn when the distance is measured at a given time and time tn+1 when the distance is measured again is substantially the same as a period between time tn−1 when the distance is measured previously and the current distance measurement time tn. It is thus logical to express the current amount of correction C(n) as follows:

$$C(in)=P(n) \qquad (4)$$

Therefore, the total amount of movement to be automatically adjusted, that, the amount of movement X(n) made by the lens with respect to the defocus amount at time t(n) is the sum of the amount of correction C(n) and the original defocus amount D(n) obtained from the distance measured at time tn. Such a sum is given as follows:

$$D(n)+C(n)=2D(n)+C(n-1) \qquad (5)$$

According to equation (5), the previous amount of correction C(n−1) becomes zero, that is, if a tracking servo operation is not performed beforehand, the amount to be automatically adjusted becomes 2D(n), corresponding to the amount analyzed in FIG. 17.

Figure 19:
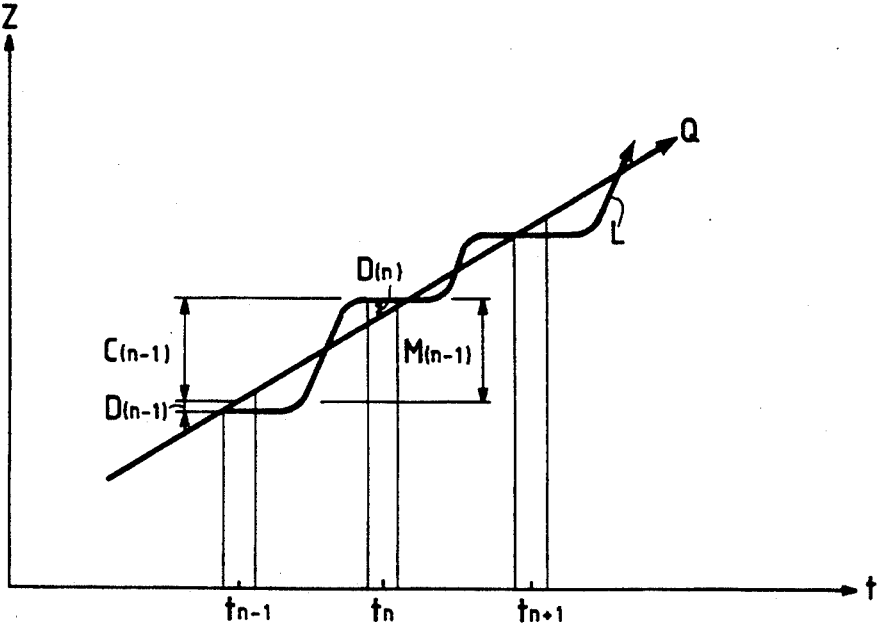

When the tracking servo operation is preformed for an object in motion in accordance with such a tracking servo method, as shown in FIG. 19, the track L of the position of the image surface of the lens follows the track of the surface of the object while the former track move above and below the latter track. At this time, the polarity of the measured value D(n) may be either pole. In either case, because feedback is provided so that the amount of correction C(n) causes the defocus amount to become zero when the distance is measured again, the lens is automatically adjusted so that it is brought into focus. In other words, because the lens is substantially focused at every accumulation time tn, the defocus amount becomes substantially zero every time the distance is measured. The amount of movement made by the surface of the lens satisfies the following equation:

$$C(n)=P(n)$$

The previously mentioned description pertains to the basic examples of the analysis and the servo method in which the discrete servo is employed to track the moving object.

Method of determining whether an object is moving

A method of determining whether an object is at rest or in motion will now be explained. As described with reference to FIG. 17, it is assumed that if the object is at rest, D(n) differs slightly from D(n−1), whereas if it is in motion, D(n) differs considerably from D(n−1). Such a condition is sufficient for performing the tracking servo operation, but is not sufficient for detecting the status of the object when the object stops. U.S. Pat. No. 4,980,715 proposes a method of determining whether an object is at rest or in motion. In this method, when the ratio, P(n)/P(n−1), of the amount of movement P(n) made by the image-forming surface of the object assumes any value between threshold values $\kappa$ and $\gamma$, that is, when the following equation is satisfied, $$\kappa < P(n)/P(n-1) < \gamma \qquad (6)$$

the object is moving, or else it is at rest. More specifically, P(n) is divided by distance measurement periods (intervals) and is regarded as the ratio of the speed at which the object moves (speed of the object). When the following equation is met, $$\kappa' < \frac{P(n)/(tn - tn - 1)}{\{P(n-1)(tn-1-tn-2)\}} < \gamma' \qquad (7)$$

the object is moving, or else it is at rest. Also, Japanese Patent Laid-Open No. 62-253107 discloses a method of determining whether an object is at rest or in motion. This method provides a condition for performing the tracking servo operation, if an amount corresponding to P(n) exceeds a predetermined amount.

Method of adjusting time of exposure to the time of focus

An example will be explained in which the amount the lens is driven is determined so that a release operation is carried out, and then the lens is focused when a shutter is opened and exposure begins.

The purpose of the tracking servo operation is to focus the lens when a photograph is actually taken, U.S. Pat. No. 4,980,715 discloses a method of controlling release timing, which is an example of a servo method after the release operation. In this method, a duration Td is made constant between when the servo operation begins (when the lens begins to operate) and when the distance begins to be measured. The release timing is controlled so that exposure time corresponds to the time when the charge of the element is again accumulated if the release operation is not performed. Such a method will be explained with reference to FIG. 20.

Figure 20:
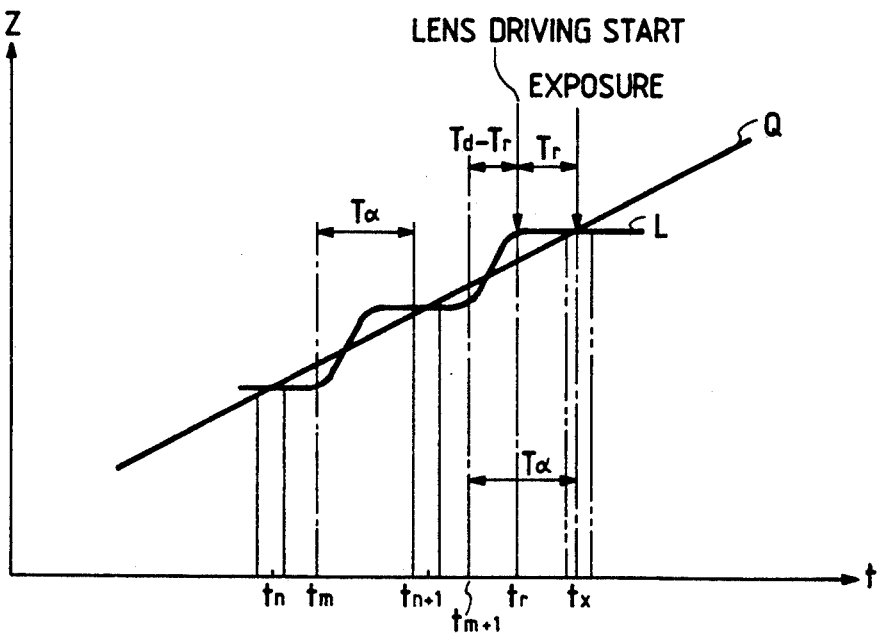

Generally, even after the charge of the photoelectric element has been completely accumulated, it takes from several 10 to 100 milliseconds before the servo operation begins. This is because it takes such time for data to be transferred (to be input) and the defocus amount to be calculated. In FIG. 20, the servo operation based on the result of the distance measured at time tn begins at time tm. For this reason, in the drawings so far given, there are elapses between the completion of accumulation and the start of the servo operation. In the method disclosed in U.S. Pat. No. 4,980,715, every time the distance is measured, the duration Td is made constant between time tm when the servo operation begins and the time when the next accumulation begins. The duration Td is set at, for example, about 100 milliseconds so that, without sacrificing response, time is obtained for driving the lens in order to perform the tracking servo for the object moving at a relatively high speed. Even if the servo operation is completed earlier than the duration Td, it stands ready and the charge of the photoelectric element is not accumulated for measuring distance again until the duration Td passes. The tracking servo method itself and the method of calculating the amount of correction C(n) are the same as those explained in FIG. 18. In this way, the intervals are made stable at which the distance is repeatedly measured, and it is expected that the lens is focused in the duration Td after the servo operation has started, regardless of the speed of the object. Therefore, in consideration of an automatic delay duration Tr after which exposure actually begins, a release start time tr is set after the servo operation has begun and a duration Td−Tr has elasped.

However, when the above servo system employing the tracking servo of the discrete servo, the method of determining the object, and the control system for adjusting exposure time at the time of release to focus timing are directly applied to the automatic focusing device of the overlap servo system, there are the following various problems and irrational aspects which must be reexamined.

(1) Problem of tracking servo

Figure 21:
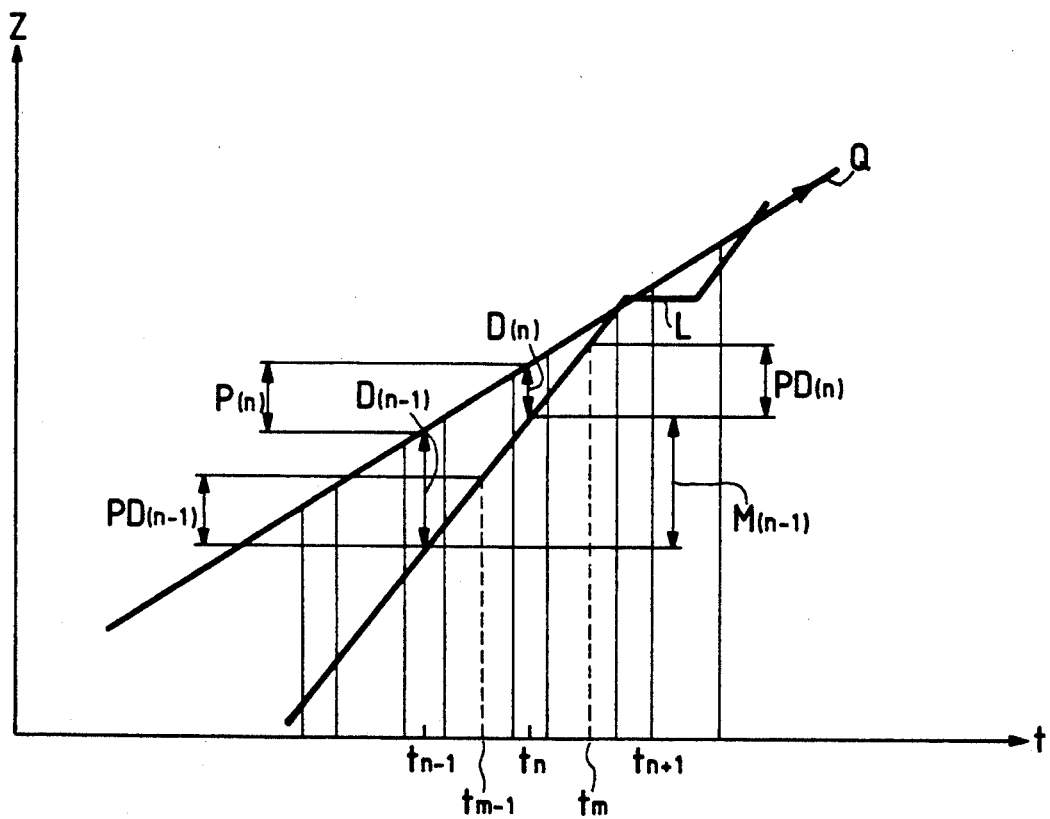

Let us consider the case where the tracking correction is applied to the overlap servo, disclosed in aforementioned U.S. Ser. No. 439,801, proposed by the applicant. FIG. 21 is a view showing the overlap servo operation for the moving object Q. Symbols in FIG. 21 are the same as those in FIG. 18. As apparent from FIG. 21, the amount of movement P(n) made by the image-forming surface of the object between times tn−1 and tn is expressed as follows:

$$P(n) = D(n) + M(n-1) - D(n-1) \tag{8}$$

This equation is obtained from the defocus amount D(n) on the basis of the distance measured at time tn, the previous defocus amount D(n−1) at time tn−1, and the amount of movement M(n−1) made by the image surface between times tn−1 and tn. From equation (8), the image surface speed S(n) of the object is given as follows:

$$S(n) = P(n)/(tn - tn-1) \tag{9}$$

Equations (8) and (9) are the same as in the discrete servo. However, in the overlap servo, because the distance is measured before the servo operation is completed, the amount of movement made by the lens between times tn−1 and tn does not satisfy the following equation, explained with reference to the discrete servo:

$$M(n-1) = D(n-1) + C(n-1)$$

Even when the overlap servo is employed, if the distance measurement interval tn+1−tn is the same every time the distance is measured, the amount of movement made by the object between times tn and tn+1 can be expressed by P(n) of equation (8). In the discrete servo, it is possible to use P(n) as the amount of correction C(n). As explained above, however, in the overlap servo, CCD data transfer time and calculation time are required between when the charge of the photoelectric element is completed and when the defocus amount is calculated. As shown in FIG. 21, during this period, the lens is usually driven. Therefore, if time denoted by tm is the time when the defocus amount is completely calculated, it is logical to regard the value which is obtained by subtracting PD(n), the amount of movement made by the lens from time tn to time tm, from P(n) as the amount of correction.

Thus, PD(n) is subtracted from the sum of P(n) and the original defocus amount D(n) obtained from the distance measured at time tn. The total amount of movement made by lens to be automatically adjusted is expressed as follows:

$$D(n) + P(n) - PD(n) = 2D(n) + M(n-1) - D(n-1) - PD(n) \tag{10}$$

Experiments conducted by the inventors, however, prove that if equation (10) is applied to the overlap servo, the following problem arises. This problem will be explained in detail with reference to FIG. 10.

For the following let it be assumed that the focus detecting signal obtained by the accumulation at time tn is processed and the defocus amount D(n) is calculated at time tm, and that a point A indicates the position where the lens forms the object into the image at time tm. Then, the amount of correction C(n) to be made at the point A is expressed by the following equation:

$$C(n) = D(n) + M(n-1) - D(n-1) - PD(n) \tag{11}$$

where PD(n) is the amount of movement made by the lens between times tn and tm

The defocus amount D(n) at time tn is added to D(n), and the resulting value is the amount the lens is driven, expressed by equation (10). If the lens-driving motor is powerful enough to move the lens in an instant, the amount the lens is driven is expressed by equation (10), the lens moves as indicated by a line L1 from the point A. Thereby the lens is substantially brought into focus at the next accumulation time tn+1. In reality, however, the power of the motor is limited, and the advantage of the overlap servo is a quick response the movement of an object. In order not to spoil this advantage, as soon as the result of the distance measured at time tm is obtained, it is desirable that the lens be driven and the distance be measured again. Thus, as indicated by a broken line L2, while the distance is being measured again, the lens must be driven.

The amount of correction discussed so far is a value to be added to the current defocus amount D(n) in order to make the next defocus amount D(n+1) zero when the movement of the lens will be completed by the time the distance is measured again. Therefore, even if the amount of correction expressed by equation (4) is directly applied to a driving model, which provides the image surface such as that indicated by the line L2, the defocus amount does not converge on zero every time the distance is measured. The position of the image surface L2 obtained by the servo operation does not reach the image-forming position indicated by the line Q, and is always positioned below the line Q.

As has been described, if the servo method adopting the tracking servo of the discrete servo is employed for the overlap servo, the lens is not focused.

(2) Problem of determining whether an object is moving

In the discrete servo, the amount of movement P(n) made by the image-forming surface of the object, and the ratio of the amount of movement P(n) expressed by P(n)/P(n−1) or {P(n)/(tn−tn−1)}/{P(n−1)(tn−1 - tn−2)}, are all basically based on the investigation on the speed of the object and the stability of the object. Also, in the overlap servo, since the speed of the object can be obtained by equation (9), the following conditions may be established:

$$S(n) > \delta \quad (12)$$

or $$\alpha < S(n)/S(n-1) < \beta \quad (13)$$

Equation (12) shows that the speed of the object is greater than a threshold value $\delta$ [mm/sec], whereas equation (13) shows that the speed of the object measured in succession is within a range of the ratios $\alpha$ and $\beta$. In other words, these conditions prove that the speed of the object is stable.

Although the above conditions are rational to some extent, it cannot be expected that the accuracy of detection will be high. This is because in the overlap servo the distance measurement intervals are very short, during which intervals the amount of movement made by the object is extremely small, and because the speed of the object S(n) expressed by equation (9) is obtained from data of the distance measured twice in succession.

(3) Problem with method of adjusting time of exposure to time of focus

As described above, the duration Td is made constant between when the servo operation begins and when the distance begins to be measured again, and the release operation adjusts the exposure timing to the time of focus. Therefore, even after the release operation has been performed, release is not immediately permitted. Thus, if such a system is applied to the overlap servo system, in which the lens is driven to track the object during accumulation, the advantages of the overlap servo system will be spoiled.

The embodiments of the present invention will now be described, which embodiments solve the previously mentioned problems.

First and second embodiments showing a basic automatic focusing device of the invention will be explained with reference to FIGS. 1 to 5.

First embodiment

Figure 1:
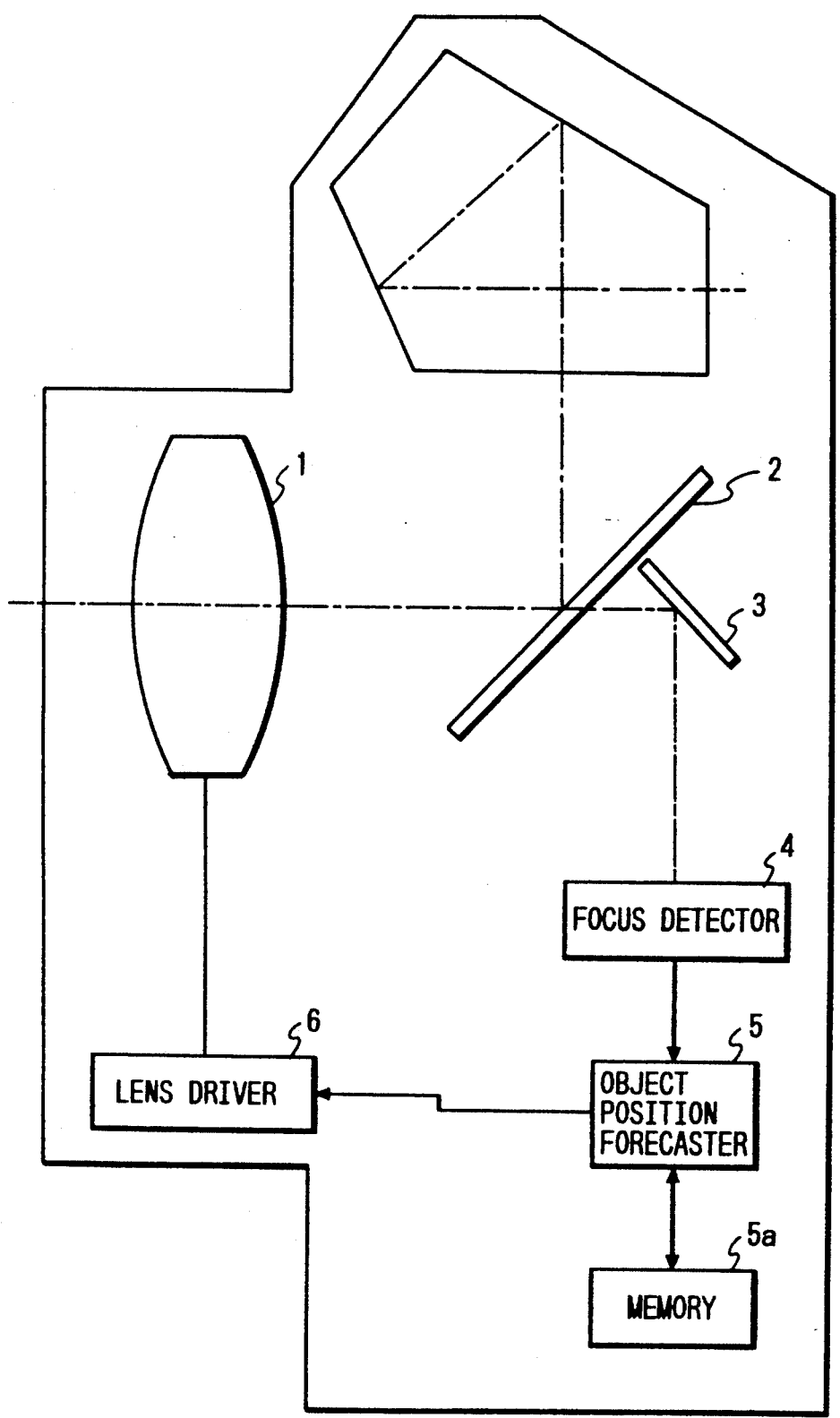
FIG. 1 is a block diagram showing a first embodiment.

FIG. 1 is a block diagram of the automatic focusing device, which is the first embodiment of this invention.

Luminous flux emanated from an object passes through a lens 1, reaching a quick return mirror 2. A part of the luminous flux passing through a translucent portion of the mirror 2 is reflected from a sub-mirror 3, and is led to a focus detector 4.

The focus detector 4 is composed of a well-known focus detecting optical system, an image sensor and a calculating portion for detecting focus. The focus detector 4 intermittently calculates an amount that corresponds to distances of a film conjugate surface, which is a predetermined image-forming surface, and of the image surface of the lens 1 along an optical axis. In other words, the focus detector 4 calculates the amount of defocus.

An object position forecaster 5 is composed of peripheral equipment, such as a microcomputer and a memory 5a. On the basis of the defocus amount calculated by the focus detector 4, the object position forecaster 5 predicts the position of the surface of the object, and controls, with the aid of a lens driver 6, the lens 1 so that the position of the surface of the lens 1 corresponds to a predicted position of the image surface.

Figure 2:
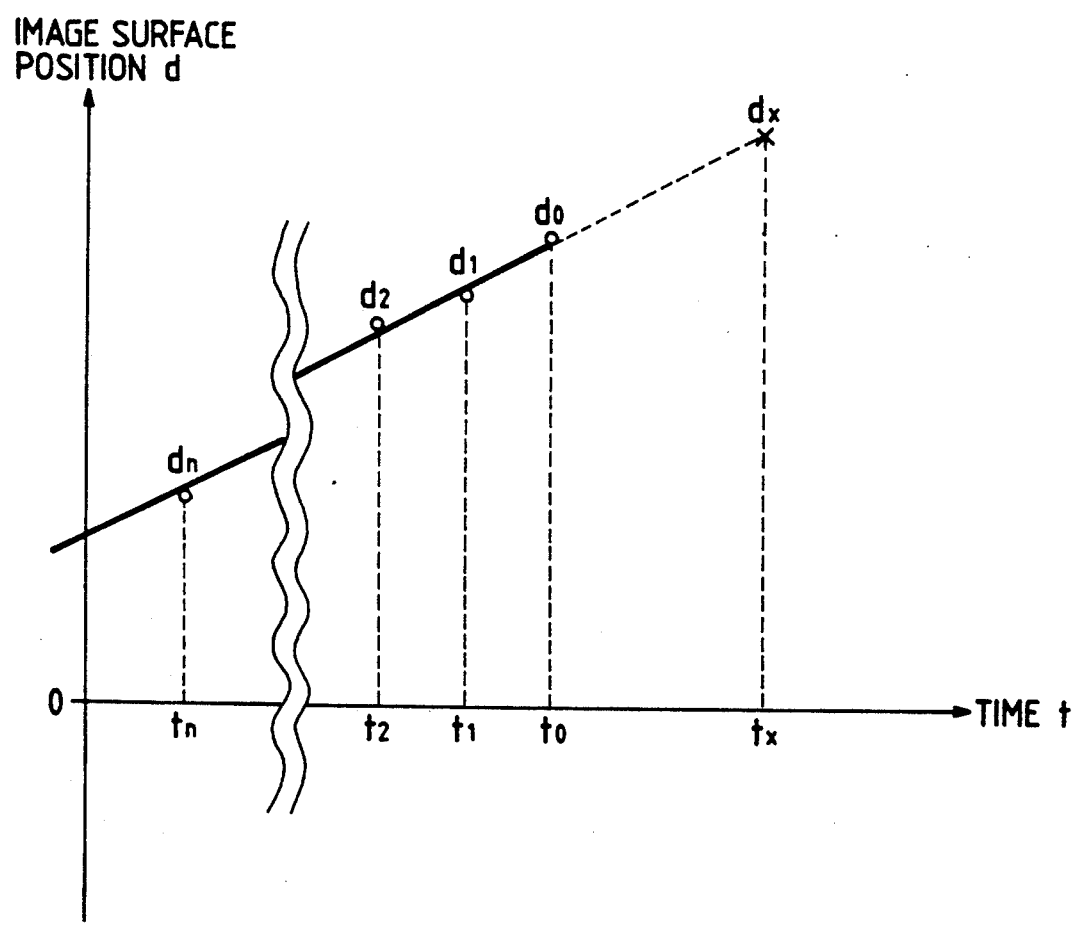
FIG. 2 is a view showing the position of the image surface of an object and that of a photographic lens at time t.

FIG. 2 shows the actual positions of the image surface of a moving object at time t while a tracking drive is performed and positions of the image surface at every detection time. The tracking drive is a lens driving system in which the lens 1 is driven so that the position of the surface of the lens 1 always corresponds to the position of the image surface of the actual object.

In FIG. 2, a track indicated by a solid line shows the positions of the image surface of the actual object. Positions denoted by d0 to dn are the positions of the surface of the object detected by the focus detector 4. Of these detected positions, the position denoted by d0 pertains to recent positional information, and positions denoted by d1 to dn pertain to past positional information. In this embodiment, dn indicates positional information which is n time intervals older than the recent positional information d0. The detected positions include deviations from the solid line, indicating the positions of the image surface of the actual object, that is, detection error.

A method of calculating the position dx of the surface of the object at time tx will be described below.

The speed Vz at which the surface of the object moves at time t0 is calculated from the following equation:

$$Vz = (d0 - dn)/(t0 - tn) \quad (14)$$

where n: 1, 2, 3 . . .

Hence, the position dx of the image surface at time tx can be determined from the equation given below:

$$dx = V_z \cdot (tx - t0) + d0 \quad (15)$$

When the lens 1 is controlled so that the position of the surface of the lens 1 corresponds to the position dx calculated by the above equation at time tx, the lens 1 is brought into focus at time tx, and a focused photograph can be taken. Also, after time tx, when the position of the surface of the object is tracked and the lens 1 is driven, it is possible to take a focused photograph whenever a shutter release operation is performed.

The error of the position dx of the image surface predicted and calculated by equation 15 at time tx will be discussed.

The speed Vz at which the surface of the object moves, the speed calculated by equation 14, includes an error caused when the focus detector 4 detects the positions d0 and dn of the surface of the object. The longer a detection time interval (t0−tn) becomes, the smaller the error becomes. Furthermore, the position dx of the image surface, calculated on the basis of the moving speed Vz of the image surface, includes an error in proportion to the error of the moving speed Vz of the image surface. The closer time tx approaches time t0, the smaller this error becomes.

The above description leads to the following conclusion. If the recent positional information d0 and any one piece of past positional information, which is two or more time intervals older than the recent positional information d0, are used to predict the position dx of the image surface, then the error included in the moving speed Vz of the image surface, calculated by equation 14, becomes smaller. Consequently, the error of the position dx calculated by equation 15 also becomes smaller.

In this embodiment, n=2, and the recent positional information d0 and the positional information d2 that is two time intervals older than the information d0 are used to predict the position dx of the image surface. In such a case, because the detection time interval (t0−tn) of equation 14 doubles, the error of the moving speed Vz of the image surface reduces by half, and consequently the error of the position dx of the image surface also reduces by half, as compared with the case where the recent positional information d0 and the positional information d1 that is one time interval older than the information d0 are used to predict the position dx of the image surface.

It is preferable to set the detection time interval (t0−tn), used for predicting the position dx of the image surface, longer than a release time lag (from the release of the shutter to actual exposure) with reference to the particular camera. Thus, when the detection time interval (t0−tn) is short, positional information satisfying a relationship (t0−tn)≧td is selected from the recent positional information d0 and the past positional information d2, which is two time intervals older than the information d0.

Figure 3:
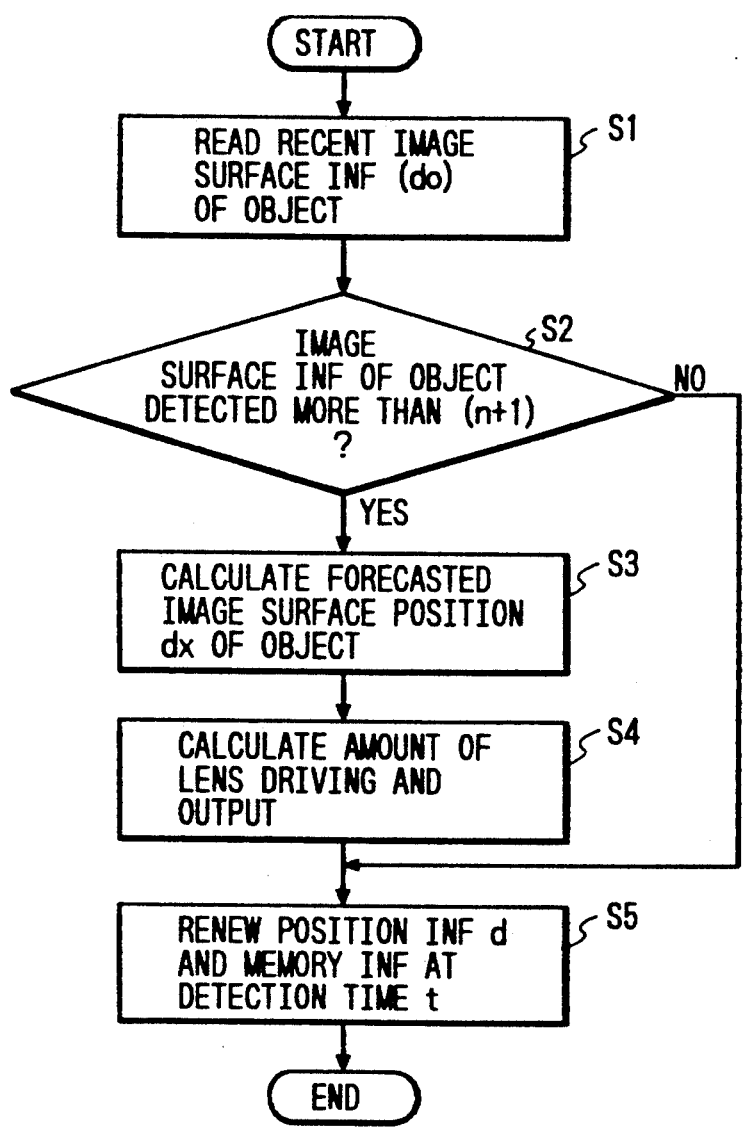
FIG. 3 is a flowchart showing a computing program for forecasting the position of the object according to the first embodiment.

FIG. 3 is a flowchart showing a computing program for predicting the position of the object, this program being executed by the object position forecaster 5. Every time the focus detector 4 calculates focus detecting information, the program is executed. The operation of the first embodiment will be explained with reference to FIG. 3.

In step S1, recent positional information regarding the surface of the object is read from the focus detector 4. Then, the process flows to step S2, where a determination is made whether this positional information is detected more than (n+1) times, i.e., more than twice. If the positional information is detected more than (n+1) times, the process flows to step S3, whereas if not, it proceeds to step S5. In step S3, two pieces of positional information d0 and d2 are used to calculate, from equations 14 and 15, the position of the surface of the object. In step S4, a difference (dx−d0) between the calculated position and the current position is determined, and is converted into an amount of driving the lens 1. The amount is output to the lens driver 6, which in turn controls the lens 1.

In step S5, the detected positional information regarding the surface of the object and memory information at detection time t are updated. In other words, dn−1 is updated to dn, tn−1 being updated to tn. This completes the execution of the program.

Thus, of pieces of focus detecting information calculated at the predetermined time intervals, the recent positional information and one piece of past positional information, which is two or more time intervals older than the recent information, are used to predict the position of the surface of the object. It is therefore possible to calculate more accurately and quickly the position of the object than in the conventional art, in which all focus detecting information is statistically processed to predict the position of the object.

Second embodiment

When an image sensor, such as a CCD, of a charge accumulating type is employed for detecting focus, the brighter the luminance of a photographic plane will be, the shorter the time required for detecting focus becomes, whereas the darker it will be, the longer the time becomes. Consequently, when the photographic plane is bright, the focus detecting time intervals become short. As described above, with the predetermined detection time intervals (t0−tn) secured, to minimize the error in predicting the position, past positional information which is three, four or more time intervals older than the recent positional information is selected in accordance with the luminance of the photographic plane.

Figure 4:
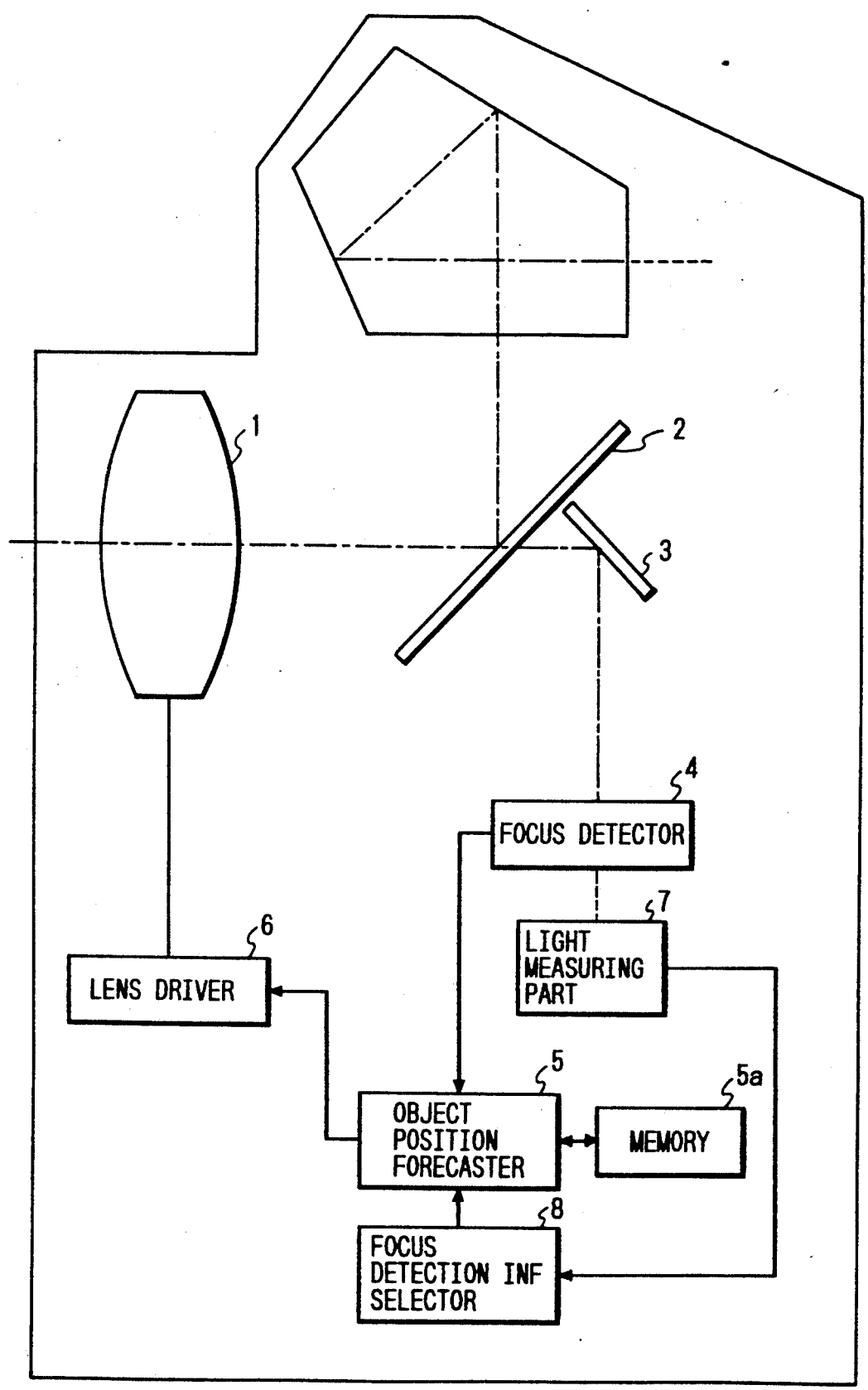
FIG. 4 is a block diagram showing a second embodiment.

The second embodiment will be described below with reference to FIG. 4. In FIG. 4, the same components as those in FIG. 1 are denoted by the identical symbols. The second embodiment will be explained with emphasis on differences from the first embodiment.

A portion of luminous flux is led from an object to a focus detector 4 and also to a light measuring part 7, which is disposed near an image sensor (not shown) of the focus detector 4. The light measuring part 7 meters the light of a focus detecting zone of the focus detector 4, calculates luminance information, and outputs it to a focus detection information selector 8.

On the basis of the luminance information, the focus detection information selector 8 selects positional information from past positional information regarding the surface of the object. The selected positional information is used for calculating the position of the object. In other words, the brighter the luminance is, the older the positional information used will be.

Figure 5:
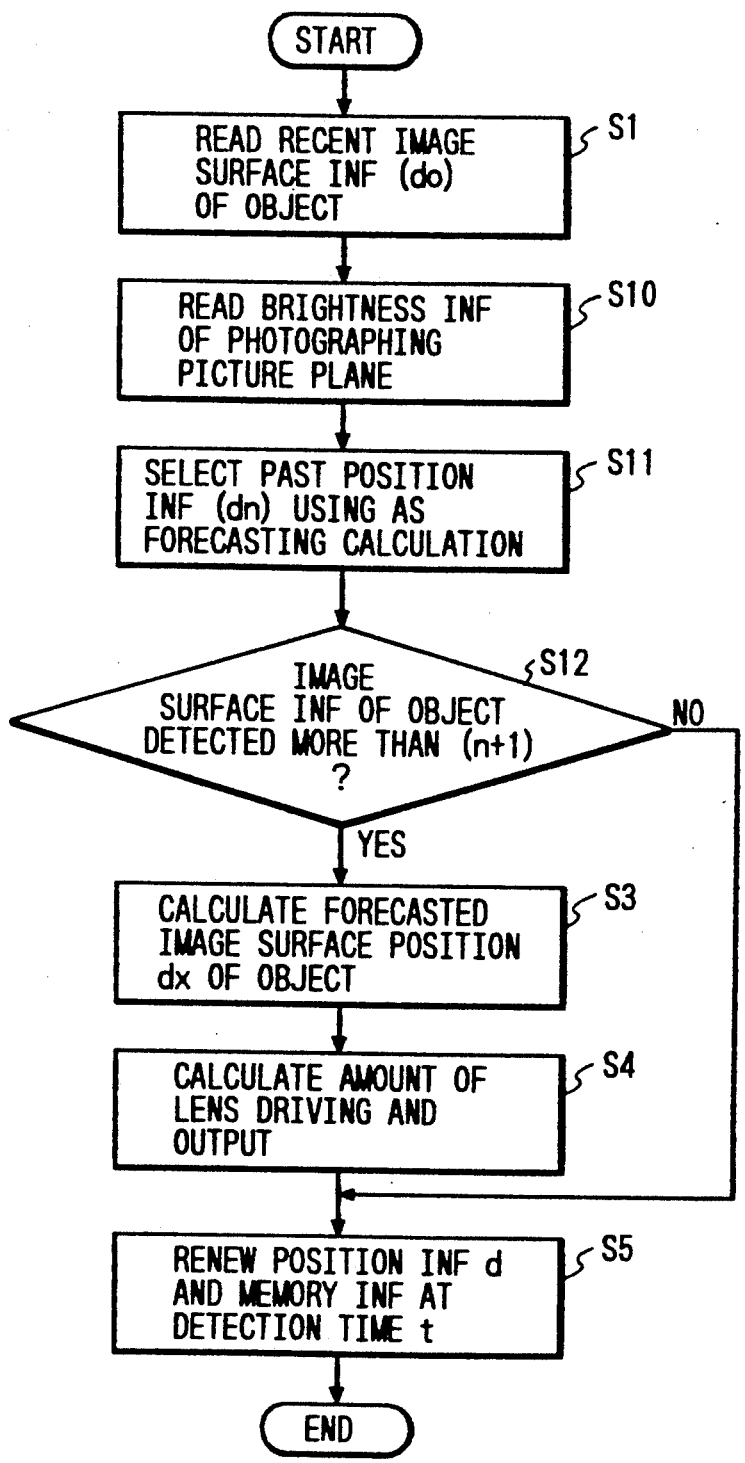
FIG. 5 is a flowchart showing a computing program for forecasting the position of the object according to the second embodiment.

FIG. 5 is a flowchart showing a computing program for predicting the position of the object, according to the second embodiment. The operation of the second embodiment will be described with reference to FIG. 5. In FIG. 5, the same steps as those in FIG. 3, which is a flowchart showing the computing program for predicting the position of the object according to the first embodiment, are denoted by the identical reference numbers. Those aspects different from the first embodiment will be mainly described.

In step S1, recent positional information d0 regarding the surface of the object is read. Then, the process flows to step S10, where the luminance information is read, which is obtained by the light measuring part 7 meters the light of a photographic plane. In step S11, on the basis of the luminance information read at step S10, past positional information is selected for calculation. This calculation is used for predicting the position of the surface of the object. For example, when the luminance is bright, positional information d5, which is five time intervals older than the recent position information d0, is selected. On the other hand, when the luminance is dark, positional information, which is three time intervals older than the recent position information, is selected. As mentioned above, at this time, it is desirable that the positional information be selected so that a relationship $(d0-dn) > td$ is established.

In step S12, a determination is made whether the positional information is detected more than $(n+1)$ times. If the positional information is detected more than $(n+1)$ times, the process flows to step S3, whereas if not, it proceeds to step S5.

In step S5, in the same manner as in the first embodiment, the positional information regarding the object selected in step S11 is used to calculate the position of the surface of the object. On the basis of the calculated position dx, the lens 1 is controlled to bring it into focus. Then, the positional information d and a detection time t are updated. The execution of the program is completed.

Thus, in accordance with the luminance of the photographic plane, the past information for detecting the position of the object is selected and used to predict the position of the surface of the object. It is therefore possible to accurately calculate the position of the object in a short time, regardless of the brightness and darkness of the photographic plane.

In the second embodiment described above, though the focus detecting zone of the focus detector 4 is measured by the light measuring part 7, disposed near the image sensor, it may also be measured by the light measuring part arranged in a finder.

In the first and second embodiments, the case has been explained where the lens tracks the moving object. The present invention, however, may also be applied to the case where the lens is controlled only when the shutter is released and exposure is made. It is thus possible to accurately predict the position of the object in a short time.

Third embodiment

With reference to FIGS. 6A to 14, an overlap type automatic focusing device will be described.

Figure 6A:
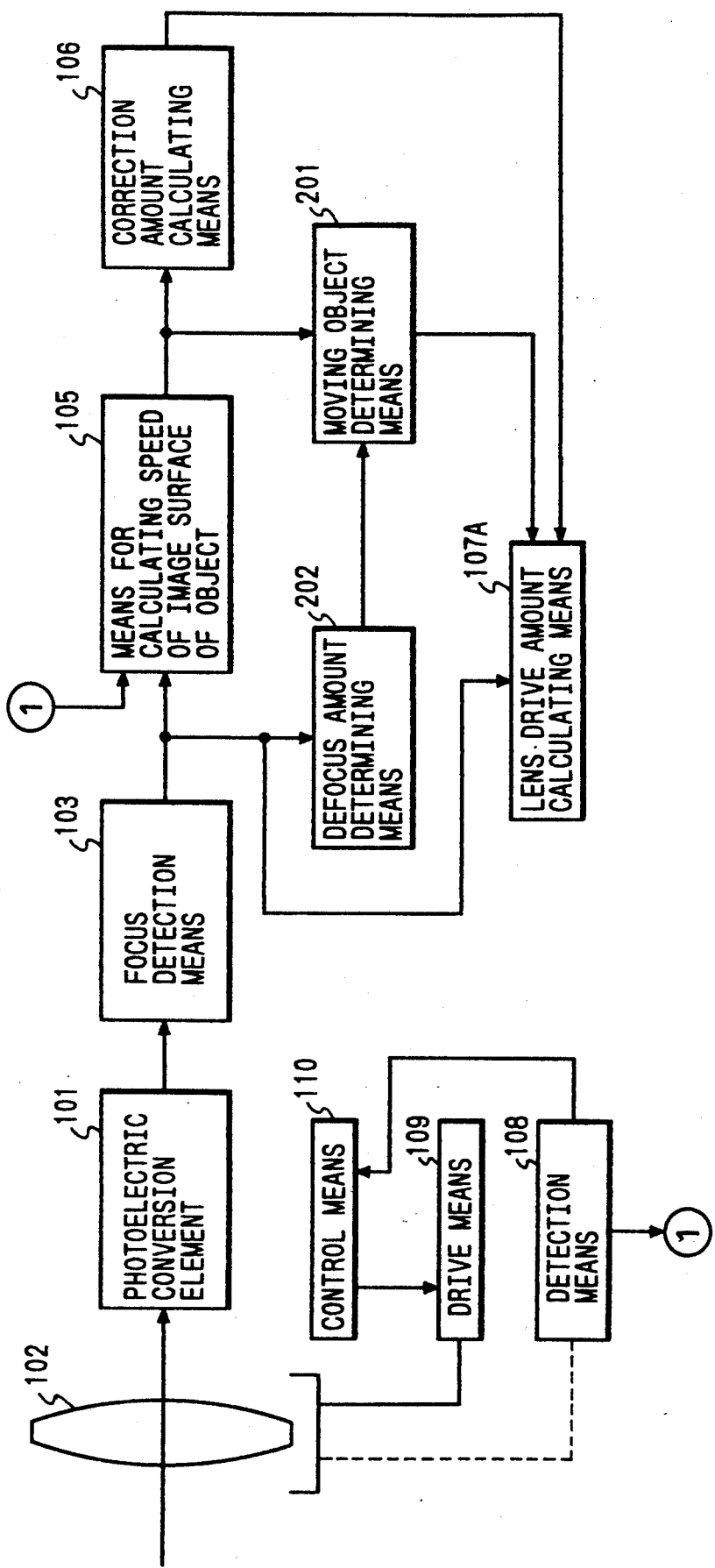
FIGS. 6A, 6B, 7, 8A, 8B, and 9-14 show a third embodiment of an overlap type automatic focusing device in accordance with the present invention.

The structure of the automatic focusing device will be explained with reference to FIGS. 6A and 6B, which show in detail the structure of the automatic focusing device shown in FIG. 15.

The overlap type automatic focusing device shown in FIG. 6A comprises a photoelectric element 101 of a charge accumulating type; focus detecting means 103; means 105 for calculating the speed at which the surface of the object moves (hereinafter referred to as speed calculating means); and means 106 for calculating the amount of correction (hereinafter referred to as correction amount calculating means). The automatic focusing device further comprises means 107 for calculating the amount the lens is driven (hereinafter called lens drive amount calculating means); means 108 for detecting the amount of movement made by the lens (hereinafter called detecting means); driving means 109; and control means 110. The focus detecting means 103 converts focus detecting luminous flux into a detecting signal. The focus detecting luminous flux impinges on the photoelectric element 101 after having passed through a lens 102. On the basis of the detecting signal, the focus detecting means 103 calculates the amount of deviation between an image-forming surface and a predicted image-forming surface of focus detecting luminous flux. The speed calculating means 105 calculates the speed at which the surface of the object moves (hereinafter referred to simply as the speed of the object). This calculation is based on two kinds of defocus amounts calculated at predetermined time intervals and on the amount of movement made by the image-forming surface of the lens 102 while the two kinds of defocus amounts are being calculated. The correction amount calculating means 106 calculates the amount of correction correlated with the speed of the object, which speed is calculated by the speed calculating means 105. The lens drive amount calculating means 107 adds the amount of correction to a recent amount of defocus so as to calculate the amount the lens is driven for performing the tracking servo operation. The detecting means 108 detects the amount of movement actually made by the lens 102. The driving means 109 automatically adjusts the lens 102 in accordance with the amount the lens is driven and the amount of movement actually made by the lens. The former amount is calculated by the lens drive amount calculating means 107, the latter amount being detected by the detecting means 108. The control means 110 operates in such a manner that while the driving means 109 is automatically adjusting the lens 102 to its focus position, the charge of the photoelectric element 10 is accumulated, so that the charge of the element 10 is accumulated and the servo operation is performed from one time interval to the next. A period for accumulating the element 10 and a period for performing the servo are overlapped with each other.

The problem with the accuracy of this speed is solved when the speed calculating means 105 calculates the speed of the object on the basis of the two defocus amounts. The two defocus amounts are obtained by a recent focus detecting signal and a focus detecting signal which is two or more time intervals older than such recent focus detecting signal.

If the time for accumulating the charge of the photoelectric element 101 is short, a time interval is made long during which interval the two focus detecting signals for determining the speed of the object are taken.

An improved automatic focusing device shown in FIG. 6A comprises the focus detecting means 103; the speed calculating means 105; means 201 for determining whether an object is moving (hereinafter referred to as moving object determining means); the correction amount calculating means 106; lens drive amount calculating means 107A; the detecting means 108; the driving means 109; and the control means 110. From the speed of the object calculated by the speed calculating means 105, the moving object determining means 201 determines whether the object is at rest or in motion. When a determination is made that the object is in motion, the lens drive amount calculating means 107A calculates the amount the lens is driven on the basis of the amount of correction and the defocus amount. On the other hand, when a determination is made that the object is at rest, the lens drive amount calculating means 107A calculates the amount the lens is driven on the basis of the defocus amount.

The previously mentioned problem of determining whether an object is moving is solved by employing the moving object determining means 201 as constructed below. If continuous and plural speeds of the surface of the object, which speeds are calculated at time intervals, are of the same polarity, and if each speed of the object is greater than its threshold value, then a determination is made that the object is in motion. Once such a determination is made, it is retained unless another determination is made that the speed of the object assumes a value which is smaller than the threshold value.

The automatic focusing device mentioned above further comprises means 202 for determining whether or not the defocus amount is greater than a predetermined value (hereinafter called defocus amount determining means). Even if the moving object determining means 201 determines that the object is in motion, the lens drive amount calculating means 107 does not use the amount of correction to calculate the amount the lens is driven unless a determination is made that the defocus amount is smaller than a predetermined value.

The moving object determining means 201 determines that the object is in motion when the ratio of the speed of the object to the speed at which the image-forming surface of the lens 102 moves is greater than the predetermined threshold value. This ratio is determined during the time intervals at which at least two focus detecting signals, used for calculating the speed of the object, are taken.

Even if the moving object determining means 201 determines that the object is in motion, the lens drive amount calculating means 107 does not use the amount of correction to calculate the amount the lens is driven unless a determination is made that the defocus amount is smaller than the predetermined value.

Once the automatic focusing device performs the tracking servo operation after a determination is made that the object is moving, the ratio of the speed of the object to the speed at which the image-forming surface of the lens 102 moves, is then determined.

Figure 6B:
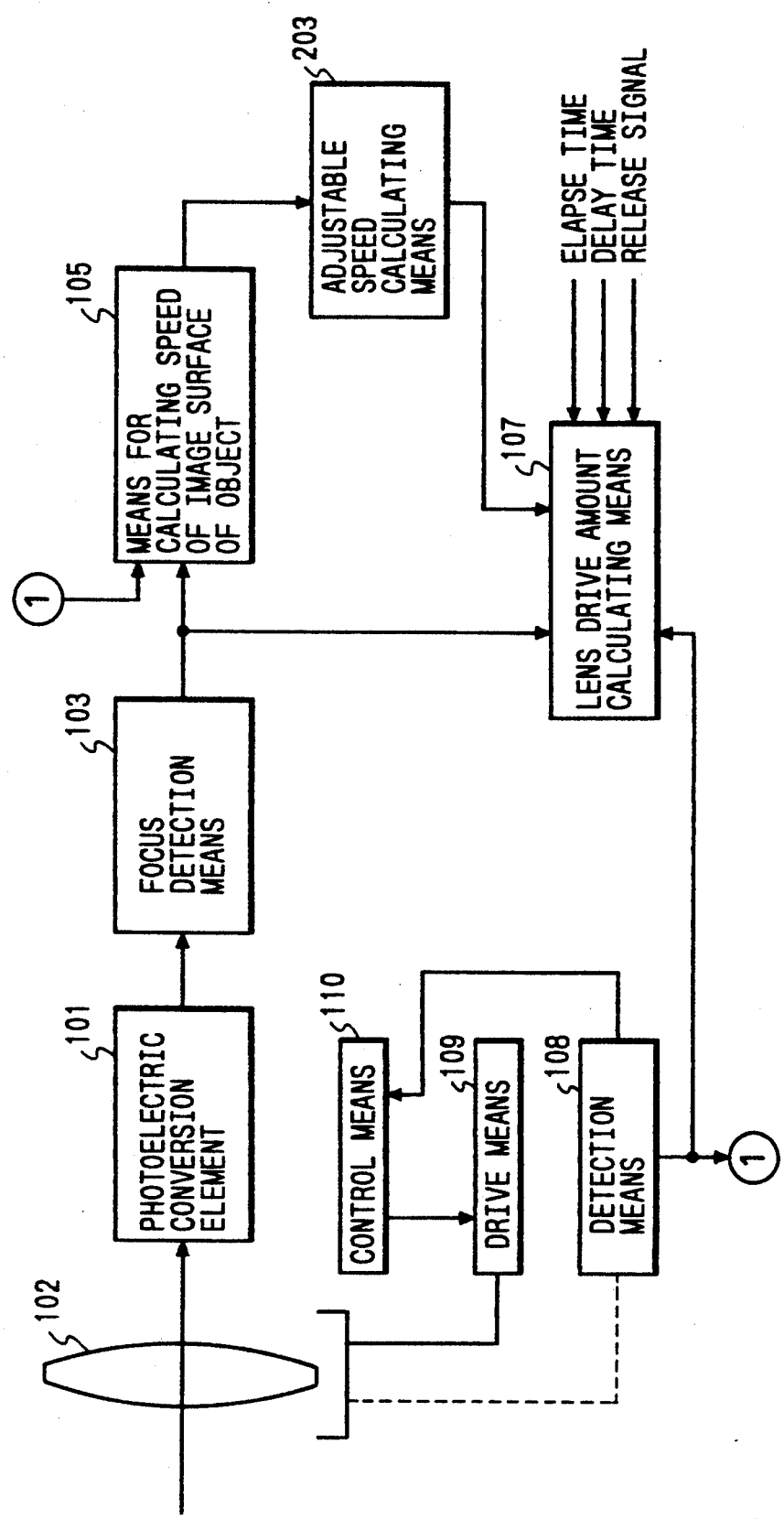

An improved automatic focusing device shown in FIG. 6B allows the start of the release operation at any time. When a release signal is detected, the lens drive amount calculating means 107 calculates the amount the lens is driven so that the lens is focused at the time of exposure. This calculation is based on a recent speed of the object calculated by the speed calculating means 105, the time elapsed between when the focus detecting signal for calculating the recent speed is accumulated and when the release signal is detected, the amount the lens is driven, and on a predetermined delay time between when the release signal is detected and when actual exposure takes place.

The above automatic focusing device comprises means 203 for calculating an increase or decrease in the speed of the object (hereinafter called adjustable speed calculating means). This calculation is based on plural speeds of the surface of the object calculated at time intervals. The amount of correction correlated with the speed of the object is calculated in consideration of adjusted speed.

With reference to FIGS. 7 to 14, the operation of an overlap type automatic focusing device, a third embodiment of this invention, will be described.

The entire structure of the automatic focusing device is the same as that of the device shown in FIG. 15. The steps of an automatic focusing process will be explained.

Figure 7:
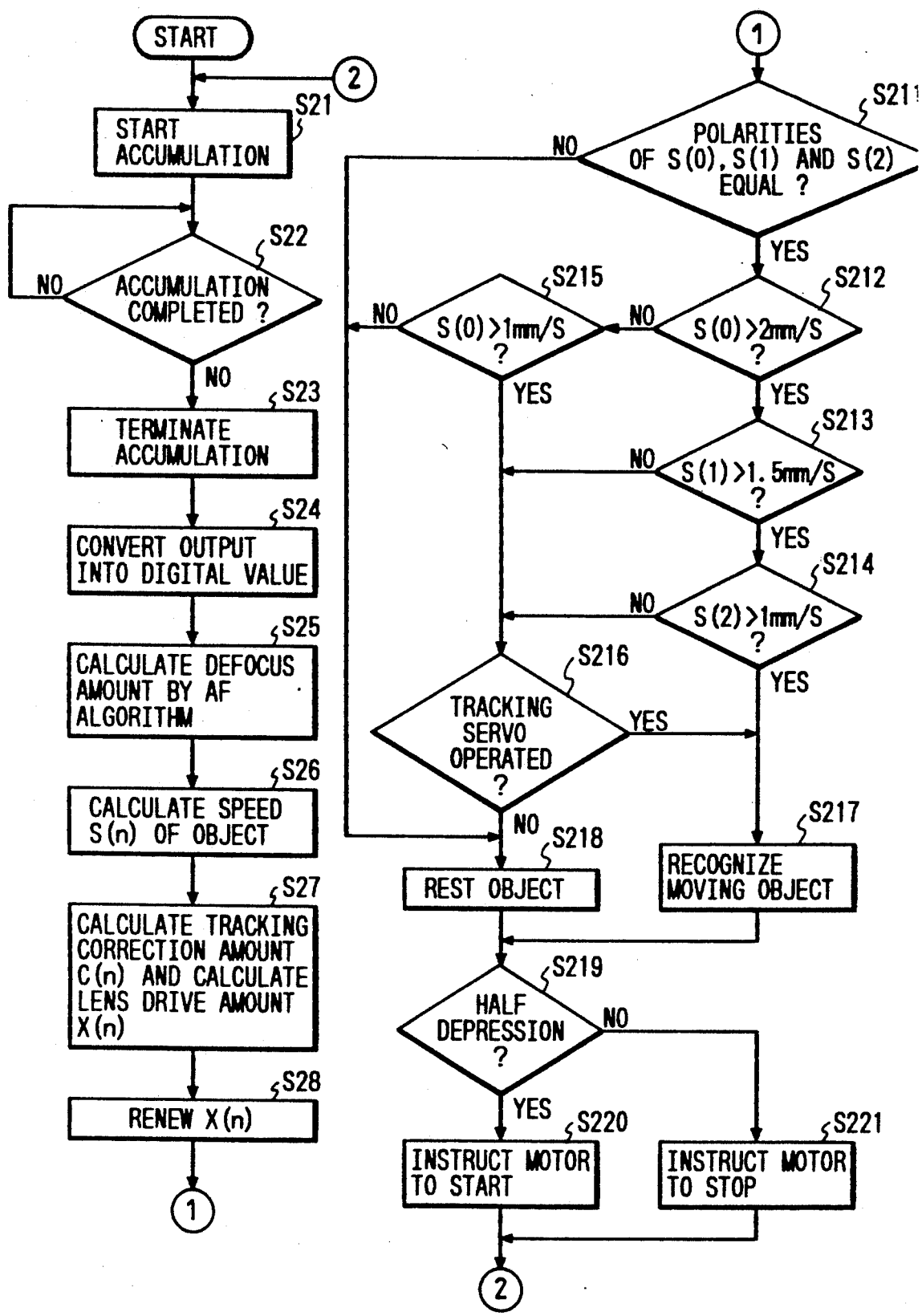

FIG. 7 is a flowchart showing steps of the automatic focusing process executed by the CPU 14.

In step S21, the charge of the photoelectric element 12 begins to be accumulated. In step S22, a determination is made whether or not the accumulation has been completed. The brighter the luminance of the object is, the shorter the accumulation time will be. If a determination is made that the accumulation is completed, the accumulation of the charge of the photoelectric element is completed in step S23. In step S24, the focus detecting signal output from the photoelectric element 12 is converted from an analog form into a digital form. In step S25, on the basis of the well-known AF algorithm, the amount of defocus D(n) is calculated. A plurality of defocus amounts D(n) are stored and updated in the memory. In step S26, the speed S(n) of the surface of the object is calculated in the following way.

Calculation of the speed S(n) of the image surface of the object

The speed S(n) of the surface of the object is calculated from the following equation:

$$S(n) = \frac{P(n) - D(n-2) + M2(n)}{t(n) - t(n-2)} \quad (16)$$

where M2(n) is the amount of movement made by the lens between times tn−2 and tn.

Figure 9:
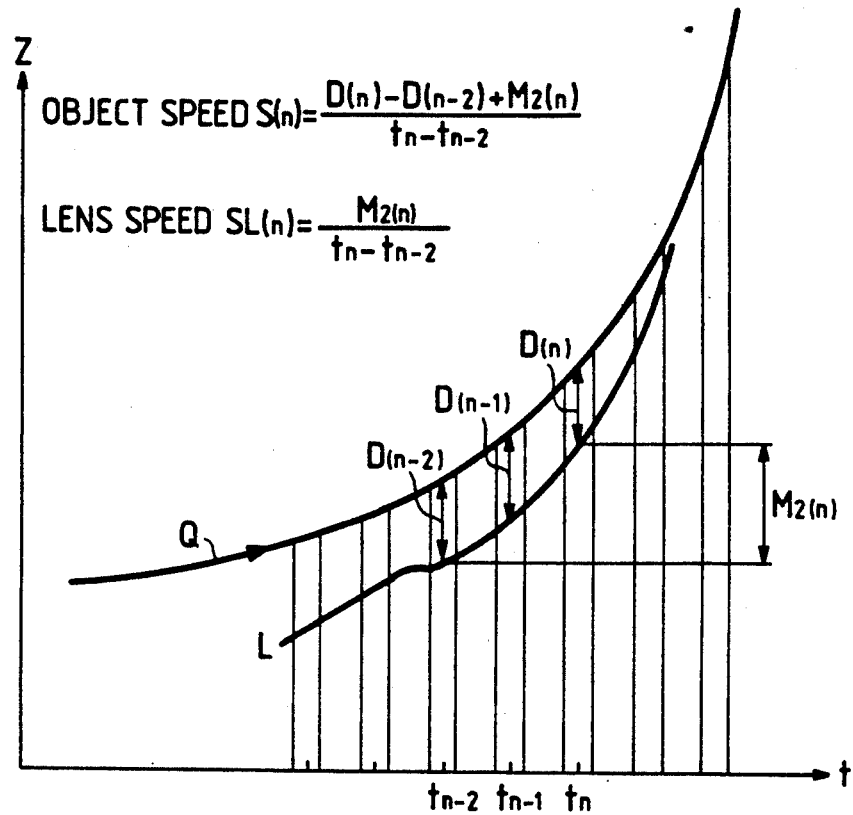

In equation (16), the speed S(n) of the surface of the object is calculated from a difference between a defocus amount D(n) and a defocus amount D(n−2). These defocus amounts D(n−2) and D(n) are detected at every two time intervals. As shown in FIG. 9, symbols, D(n−2), D(n−1) and D(n), indicate the defocus amounts detected at times tn−2, tn−1 and tn, respectively. Equation (16) shows a mean speed at which the image surface moves between times tn−2 and tn.

If the speed of the object is calculated at every three time intervals or more, it is of course possible to improve the accuracy of detection. As the speed of the object is calculated at more time intervals, the accuracy of detection improves. However, since the response to the object moving in an accelerative manner decreases, it is necessary to select an appropriate frequency of accumulation. Also, if the luminance of the object is dark, it takes longer time to accumulate the photoelectric element, thus prolonging the time intervals at which the distance can be measured. Therefore, if the speed is detected at the same time intervals as those when the luminance is bright, the response decreases. For this reason, it is preferable to select, in accordance with the accumulation time, the number of time intervals at which the speed is detected so that the time intervals for detecting the speed of the object are made substantially constant. If the distance measurement interval is longer than the time interval for detecting the speed of the object, as expressed by equation (9), a variation in the defocus amount equal to one distance measurement interval is employed.

If the distance measurement interval, at which the speed of the object is determined, is short, because of which short interval the amount of movement made by the lens cannot be obtained for detecting the speed of the object, the amounts of movement made in the past by the lens is multiplied by each other. The speed at which the surface of the object moves can be determined on the basis of the distances measured in the past. In other words, the number of distance measurement intervals varies according to the amounts of movement made by the lens at every distance measurement interval.

In step S27, the amount of track correction C(n) and the amount the lens is driven X(n) are calculated. The process flows to step S28.

Calculation of the amount of track correction C(n) and the amount the lens is driven X(n)

A second amount of correction $\alpha$ is added to the amount of track correction C(n) expressed by equation (11). Then we have $$C(n) = D(n) + M(n-1) - D(n-1) - PD(n) + \alpha \quad (17)$$

The amount the lens is driven X(n) is obtained from the following equation:

$$\begin{aligned} X(n) &= D(n) + C(n) \\ &= 2D(n) + M(n-1) - D(n-1) - PD(n) + \alpha \end{aligned} \quad (18)$$

Figure 10:
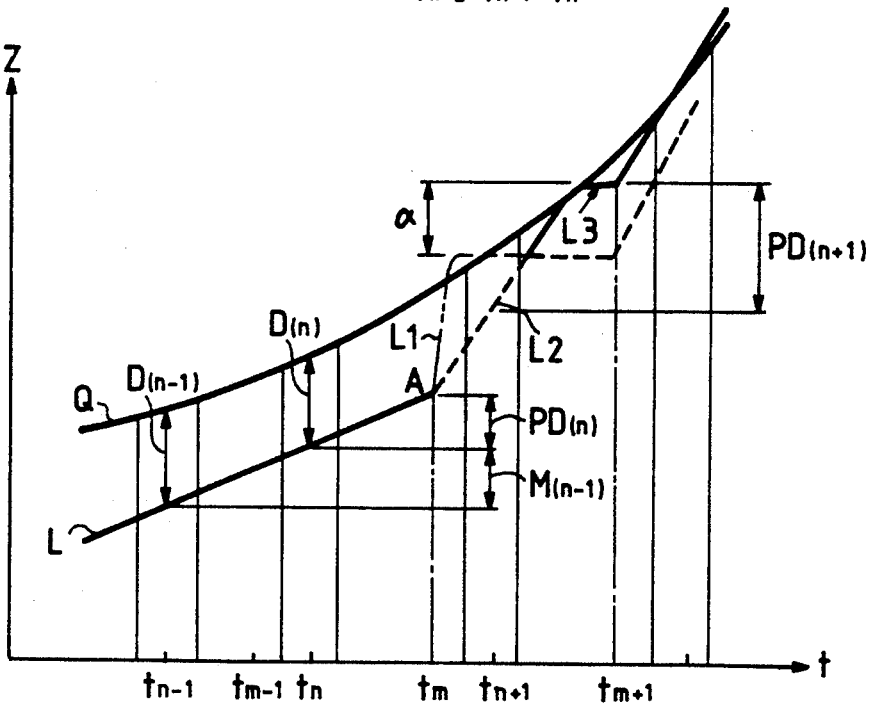

Thus, the lens is driven from the position of the object at time $tn+1$ in an amount equal to $\alpha$, as for example from a broken line L2 to a solid line L3 in FIG. 10. The lens moves closer to a line Q than before. Although it is possible for the lens to be driven until time $tm+1$ when the distance will be measured again, the servo operation may be completed before time $tm+1$. When the defocus amount is great, the lens is still being driven even at time $tm+1$. In such a case, as shown in step S28, the data in the memory is updated to the amount the lens is driven at time $tm+1$. The lens continues to be driven during the next servo operation.

Because of the amount of correction $\alpha$, the lens moves closer to the object than before as indicated by the lines L2 and L3. Considering the driving characteristics of the lens, it is logical to set the amount of correction $\alpha$ from 100 $\mu$m to 1-2 mm. An appropriate value of the amount of correction may vary according to the speed S(n) at which the surface of the object moves. If the amount of correction is made to satisfy the relationship $S(n) \times (tn - tn-1)$, a distance measured using the value is appropriate because the lens is driven from the point A to a position predicted at time $tn+2$ when the distance will be measured again. Ideally, the amount of correction is set to meet the following equation:

$$\alpha = \eta \times S(n) \times (tn - tn - 1)$$

where $0 < \eta < 1$

If the amount of correction is fixed, the lens is driven more stably than if the amount of correction expressed by the above equation were used.

If the second amount of correction $\alpha$ is regarded as PD(n), the amount of movement made by the lens between times tin and tim is disregarded. Thus, we get the following equation:

$$C(n) = D(n) + M(n-1) - D(n-1) \quad (17)'$$

The amount the lens is driven X(n) is obtained from the following equation:

$$X(n) = D(n) + C(n) = 2D(n) + M(n-1) - D(n-1) \quad (18)$$

Thus, the lens is driven from the position of the object at time $tn+1$ in an amount equal to PD(n), as for example from the broken line L2 to the solid line L3 in FIG. 10. The lens moves closer to the line Q than before. Although it is possible for the lens to be driven until time $tm+1$ when the distance will be measured again, the servo operation may be completed before time $tm+1$. When the defocus amount is great, the lens is still being driven even at time $tm+1$. In such a case, as shown in step S28, the data in the memory is updated to the amount the lens is driven at time $tm+1$. The lens continues to be driven during the next servo operation.

As a result, as shown in FIG. 10, a line L moves above and below a line Q in the same direction. Basically, the lens is substantially brought into focus. The advantage of the overlap type tracking servo over the discrete tracking servo is that intervals at which the distance is measured are short, so that data regarding the servo operation is frequently updated and the lens is driven more smoothly.

Procedure of determining whether an object is moving

In step S211, a determination is continually made whether the polarities of three speeds of the object are equal, that is, whether an object is moving toward the lens or away from it. If the three polarities are equal, in step S218 a determination is made that the object is at rest. It is verified that a determination has already been made that the object lies in one direction.

In steps S212 to S214, the three speeds, obtained at the predetermined time intervals, are compared with three different threshold values. More specifically, in step S212 a determination is made whether the speed S(0) is greater than 2 mm/sec; in step S213, whether the speed S(1) is greater than 1.5 mm/sec; and in step S214, whether the speed S(2) is greater than 1 mm/sec. While these comparisons, a determination is made that the object is not in motion, unless the speed of the object exceeds 2 mm/sec at least once in step S212. If the object moves in an accelerative manner in steps S212 to S214, this is a condition for determining that the object is in motion.

Once a determination is made that the object is in motion, whereupon the automatic focusing device is switched from a non-tracking servo operation to the tracking servo operation, the tracking servo operation is maintained unless a determination is made that the speed S0 is equal to or less than 1 mm/sec in step S215. In other words, it is conditioned that once the object is tracked, it is difficult to cease tracking the object. In the above example, the tracking servo operation is maintained once it is detected that the speed of the object exceeds 2 mm/sec. It ceases if the speed of the object is equal to or less than 1 mm/sec. While the object is being tracked, if the speed of the object S(0) becomes a value equal to or greater than 1 mm/sec and less than 2 mm/sec, and if the moving object is recognized in step S217 by the time the speed becomes the above value, then the tracking servo operation continues because a determination has already been made that the tracking servo operation is performed in step S216. In step S216 if a determination is made that the tracking servo operation is not performed, then a determination is made that the object is at rest in step S218. In step S219, a determination is made whether the shutter is half depressed. If it is, a motor start command is output in step S220. If it is not, a motor stop command is output in step S221. The process returns to step S21.

Thus hysteresis can occur before and after a determination is made whether the object is moving or before and after the performance of the tracking servo operation. As long as the object is determined based on the threshold values, an unstable servo operation is unavoidable when the speed of the object is around the threshold values. The above method permits stable performance of the tracking servo operation.

The method of determining whether the object is moving exhibits the following advantages.

Even when equations (6) and (7), determining whether the object is moving, are used to calculate the speed of the object determined by equation (16), it is not possible to consistently determine whether the object is moving if it moves at a speed close to the threshold speed or if the object decelerates while the tracking servo operation is performed. The lens therefore does not move smoothly because the tracking servo operation is switched on and off. This is especially relevant when the accuracy in measuring the distance and detecting the speed of the object is low. To solve such a problem, in the method of determining the status of the object, according to this embodiment, because the record of the speeds S(n) of the object is examined before a determination is made whether the tracking servo operation begins, that is, because of the hysteresis before and after the tracking servo operation, the status of the object can be determined quickly and consistently.

Figure 8A:
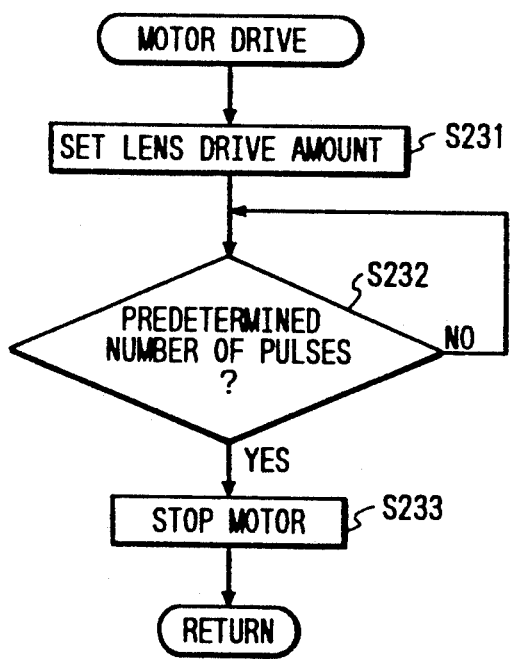

FIG. 8A is a flowchart showing the operation of an AF motor.

When the motor start command is output in step S20 shown in FIG. 7, the program shown in FIG. 8A begins to be executed. The amount the lens is driven S(n), updated in step S28 of FIG. 27, is set in the memory in step S231. In step S232, the number of feedback pulses from the encoder are counted. If this number reaches an amount equal to the amount the lens is driven and stored in the memory, the process flows to step S233, where the AF motor is stopped.

Release operation is controlled so that the lens is focus at the time of exposure A method of driving the lens after the release operation has begun will now be explained.

The overlap type tracking servo operation, unlike the conventional discrete servo operation in which the release operation is permitted only once every time the distance is measured, permits the release operation at any time.

Figure 11:
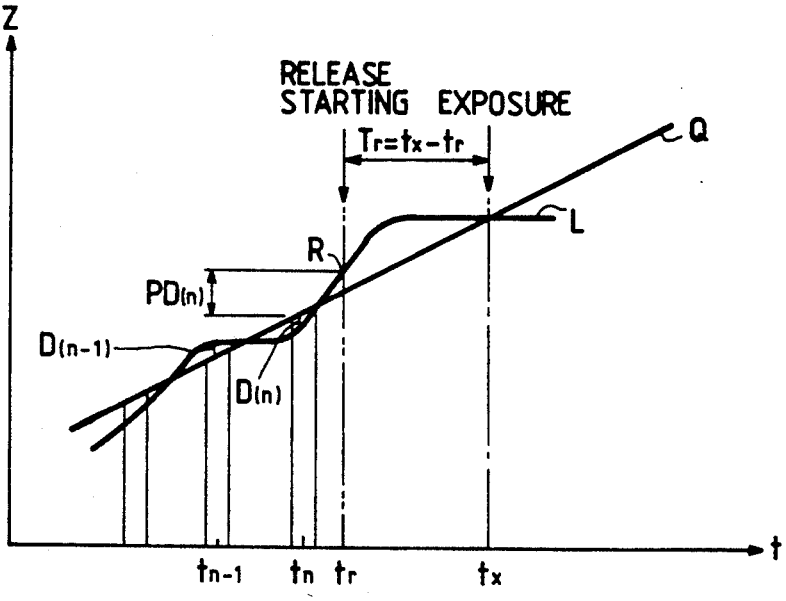
Figure 12:
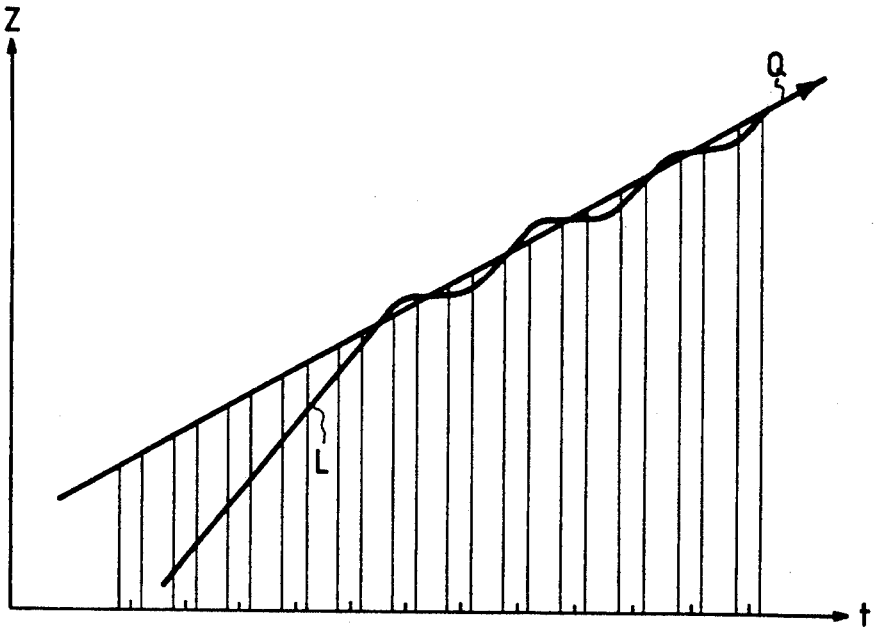

FIG. 11 shows when the release operation is performed at a given time tr during the overlap servo operation, in which the track correction is made as explained above. As described earlier, the delay time Tr between the start of the release of the camera and the start of exposure depends on the type of camera, it is typically 50 ms to between approximately one and two hundred ms. In ordinary brightness (room luminance is about Ev 8), it takes about 10 to 19 ms to accumulate the charge of the photoelectric element, and calculation time takes about 10-19 ms. Therefore, the delay time Tr is generally considered to be longer than the distance measurement interval. It is anticipated that, with the application of hardware, such as a DSP (Digital Signal Processor), as the calculation time becomes shorter, so does the distance measurement interval.

After the release operation has begun, the servo operation drives the lens so that the defocus amount becomes zero at a time tx when exposure takes place. However, since the defocus amount D(n) is an amount measured momentarily at the time tn when the distance is measured, the defocus amount is calculated not at the time tr but at the time tn, before the time tr. As analyzed in FIG. 9, because the speed of the object is expressed by equation (16), the amount of movement made by the surface of the object between the release time tr and the exposure time tx is expressed as $S(n)*Tr$. However, because time has elapsed from the time tn in an amount equal to $(tr-tn)$, the amount of movement made by the object from the time tn to the time tx is given by the following equation:

$$S(n)*(tr-tn+Tr)$$

Hence, the amount the lens is driven X(n) between the release time tr and the exposure time tx is expressed by the following equation:

$$X(n)=S(n)*(tr-tn+TR)+D(n)-PD(n) \quad (19)$$

where PD(n) is the amount of movement made by the lens between times tn and tr, and D(n) is the amount of defocus at time tn.

It should be noted that if the distance is not completely measured at the time tr, a time $tn-1$, when the distance is measured before the time tr, is regarded as a distance measurement time, and the defocus amount $D(n-1)$ must be determined on the basis of the distance measured at time $tn-1$. Consequently, the amount of movement PD(n) made by the lens is based on an amount of movement between the times $tn-1$ and tr.

Figure 8B:
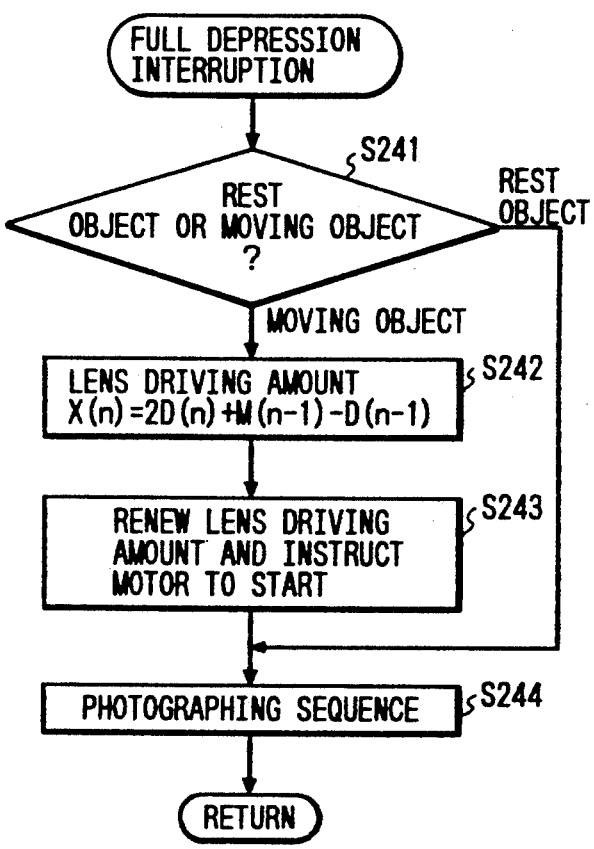

FIG. 8B is a flowchart of an interruption program executed when a release button is fully depressed.

In step S241, it is verified whether a determination has already been made that the object is at rest or in motion. If it has already been determined that the object is in motion, in step S242 the amount the lens is driven X(n) is calculated by equation (19). In step S243, the amount the lens is driven is updated, and the motor start command is output. The process flows to step S244, which is a photographic sequence, where a widely known photographic operation is performed. In step S241, if a determination has already been made that the object is at rest, the process directly flows to step S244 of photographic operation. When the shutter is released and if the servo operation has already been performed for an object at rest, the lens continues to be driven because it has already been driven according to the flowchart shown in FIG. 7.

The problem of accuracy in detecting the speed of the object, characteristic of the overlap type servo operation, will be explained.

The mean speed of the surface of the object, expressed by equation (16), is calculated by using the defocus amounts D(n) and $D(n-2)$ obtained from the distance measured while the lens is being driven. The higher the speed becomes at which the lens is moved relative to the speed at which the object moves while the distance is measured, the more the accuracy in detecting the speed of the object decreases. The accuracy in detecting the speed S(n) of the surface of the object is inversely related to the speed of the lens. Thus the reliability of determining conditions, expressed by equations (12) and (13), and of determining the object according to the flowchart shown in FIG. 7, decreases.

Figure 13:
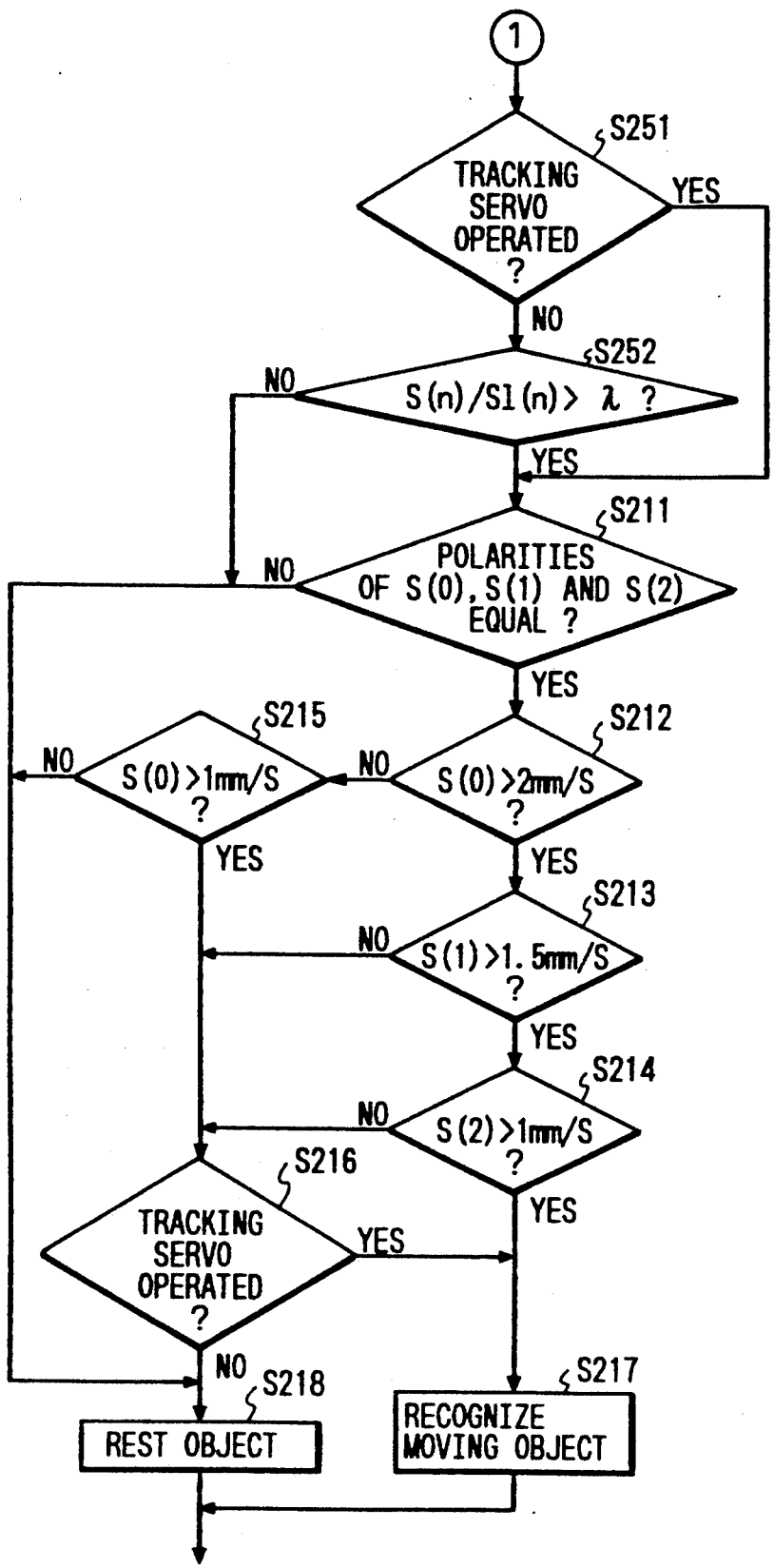

FIG. 13 is a flowchart showing a process of solving the above problem. In FIG. 13, the ratio r of the speed S(n) of the surface of the object to a mean speed S1(n) at which the surface of the lens moves during time intervals at which the speed S(n) is detected, is considered. Only steps different from those in FIG. 7 will be explained below.

Two steps S251 and S252 are added before step S211. In step S251, a determination is made whether the tracking servo operation is performed. If it is not performed, in step S252 a determination is made whether the following equation is established:

$$S(n)/S1(n) > \lambda$$

where $\lambda \leq 1$

If the above equation is established, the process flows to step S211 and subsequent steps for determining whether the object is moving. On the other hand, in step S251, if a determination is made that the tracking servo operation is performed, the process skips step S252, directly flowing to step S211.

The addition of the two steps exhibits the following advantages.

The symbol M2(n) in FIG. 9 indicates the amount of movement made by the surface of the lens between the times tn−2 and tn. Therefore, the mean speed S1 of the surface of the lens is expressed by the following equation:

$$S1(n) = M2(n)/(tn - tn - 2) \qquad (20)$$

Because the ratio of speed r is a ratio of the speed of the object to the speed of the surface of the lens, when it is equal to or greater than 1, the object moves faster than the lens moves. When it is equal to less than 1, the lens moves slower than the object moves. When the ratio of speed r is 1, the lens and the object move at substantially the same speed, and an image on the photoelectric element is substantially at rest. The distance can be measured very accurately. In other words, the closer the ratio of speed r approaches 1, the higher the accuracy of the speed S(n) of the surface of the object will be.

Because the speed of the object substantially becomes equal to the speed of the lens after the tracking servo operation has been performed, the ratio of speed approaches 1. The accuracy in detecting the speed of the object will not be adversely affected. Before the tracking servo operation is performed in the overlap type servo operation, the lens moves at a high speed, thus decreasing accuracy in measuring distances. Therefore, despite of the fact that the object at rest, the process shown in FIG. 7 flows to the step, where a determination is made that the object is in motion. Even if a determination is made that the object is in motion in accordance with the flowchart of FIG. 7, when the ratio of speed r is not 1, the ratio of speed is determined beforehand so as to avoid such a problem.

In other words, when the speed of the image surface of the object at rest is calculated while the overlap type servo operation is performed, the speed will not become higher than the speed of the lens no matter how the accuracy in measuring the distance decreases. Therefore, the following condition for recognizing the status of the object is added to step S252 in order to restrict range of the ratio of speed.

$$r \geq \lambda \ (\lambda \leq 1) \qquad (21)$$

It is possible to prevent an object at rest from being recognized as an object in motion.

Though $\lambda$ depends on accuracy in measuring distances and of parameters, it is generally recommended from experiments that $\lambda$ be 0.5. When $\lambda$ is 0.5 and the speed S(n) of the surface of the object is 50% or less than the speed of the lens S1(n), a determination that the object is in motion is not made, and therefore, the tracking servo operation will not begin. When the maximum speed at which the lens is driven is considerably higher than the speed of the object (when the former speed is twice or more as high as the latter speed), the lens approaches the object at the maximum speed, and then the tracking servo operation begins. Once the tracking servo operation has begun, it is preferable to determine whether the object is moving in accordance with the flowchart of FIG. 7 so as to maintain a stable operation, except for the condition, expressed by equation (21), for recognizing the status of the object.

That is, even if the equation (21) is not met during the servo operation, the servo operation continues to be performed if it has already begun, or the automatic focusing device is switched over to the overlap type servo operation for an ordinal object at rest.

Figure 14:
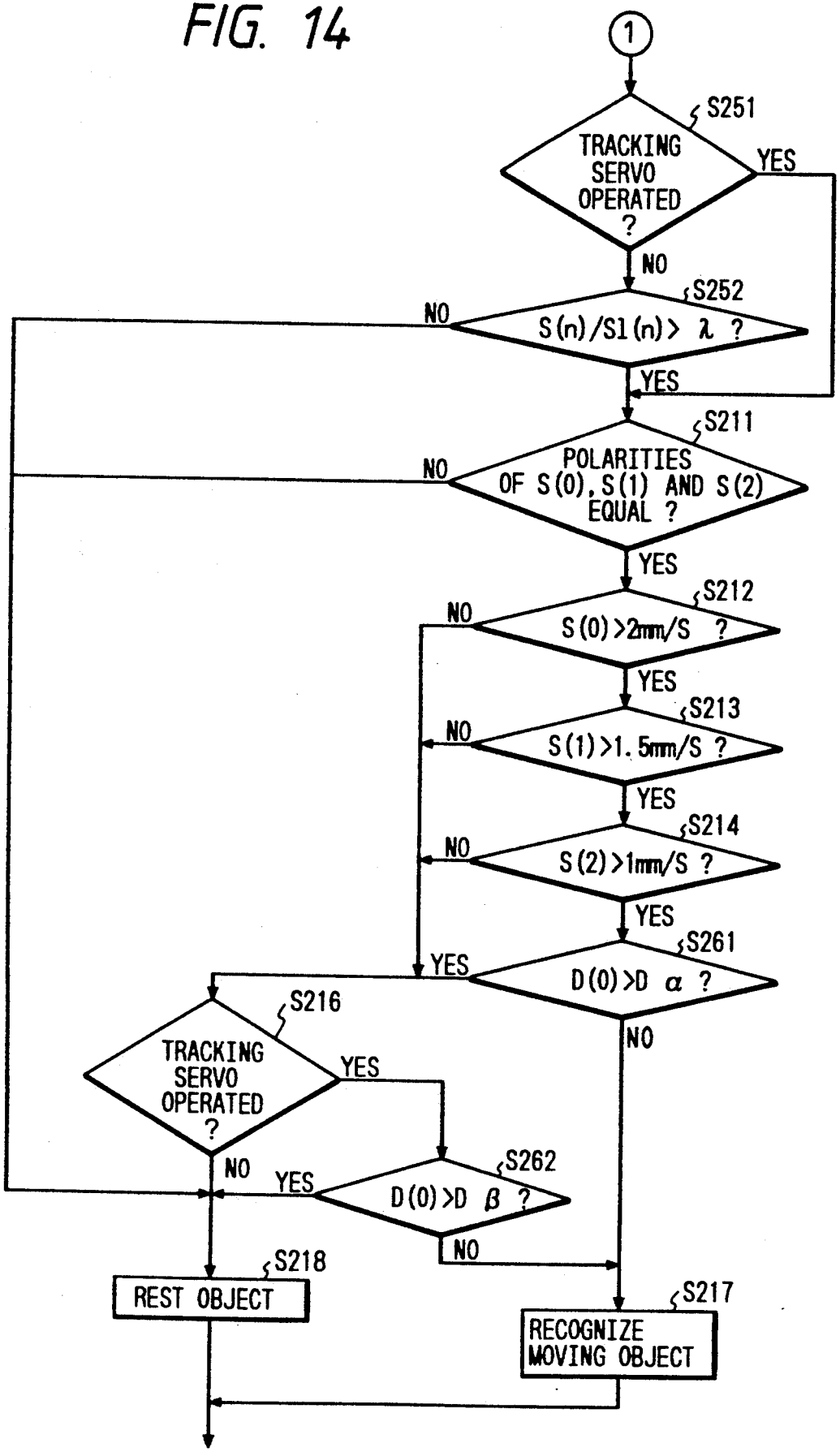

FIG. 14 is a flowchart showing a process of improving the performance of the servo operation. Only those aspects different from FIG. 13 will be explained.

Step S261 is added as a condition for determining whether the object is moving, in which step S261 a determination is made whether the defocus amount D(0) is less than predetermined value D$\alpha$. Step S262 is also added as a condition for determining whether the tracking servo operation is stopped. In this step S262, a determination is made whether the defocus amount D(0) is greater than a predetermined value D$\beta$. The predetermined value D$\alpha$ is set, for example, to 2 mm, and the predetermined value D$\beta$ is set, for example, to 6 mm.

The addition of the above two steps makes it possible for the tracking servo operation not to begin while the lens approaches the object out of focus. It is thus possible not to erroneously start the tracking servo operation for an object at rest. A high threshold value is set and hysteresis occurs to stop the tracking servo operation. It is thus possible to consistently determine whether the object is moving.

A method of improving tracking performance (tracking capability) and the accuracy with which the lens is focused at the time of exposure will be described. In this method, variations in the speed of the object are detected and are considered in calculating the amount of correction during the overlap type servo operation in order to improve the tracking performance. Also, the variations are considered in calculating the amount of servo correction after the release operation to improve the accuracy with which the lens is focused at the time of exposure.

The mean speed S(n) of the surface of the object, determined as in FIG. 9, is updated whenever the distance is measured. When a servomechanism is provided with a memory zone into which several generations of the speeds of the object are stored, an investigation on variations in these speeds show how the object (image-forming surface) accelerates. For instance, if three generations of speeds S(n) are stored, as the speed of the object increases, so does the speed value stored in the memory zones increase from S(2) to S(1) and S(0). Even if the object does not increase its speed in an accelerative manner, such situation will occur when the lens approaches the object. It is obvious from the following simple lens formula that the amount of movement made by the image-forming surface is far greater when an object 2 m away from the lens moves 1 m than the amount of movement made by the image-forming surface when an object is 10 m away from the lens and moves 1 m.

$$1/a + 1/b = 1/f$$

Considering this fact, the track Q of the image-forming surface of the object forms a curve rather than a straight line.

Apart from references to the degree of accuracy, it is possible to employ several other methods of correction in the servo operation. In every method, the performance of the servo operation is improved by driving the lens in an amount a little greater than an amount which is calculated by assuming that the object moves at a uniform speed, as determined by equation (18).

If a determination is made whether the speed of the object increases monotonously, it is easy to verify whether the image-forming surface of object moves in an accelerative manner. For the following let it be assumed that three generations of the speeds of the surface of the object are expressed, for example, as follows:

$$S(2) < S(1) < S(0) \qquad (35)$$

and that the image-forming surface of the object moves in an accelerative manner. Then, a secondary amount of correction Ca(n) compensating for the acceleration of the object at the time tm, shown in FIG. 10, is predicted and expressed by the following equation:

$$Ca(n) = \{S(n) - S(n-1)\} * (tn - tn - 1) \qquad (22)$$

where $\{S(n) - S(n-1)\}$ is the amount the speed is accelerated again.

The amount Ca(n) is added to equation (17) or (18) to determine the amount the lens is driven.

As regards the amount of correction after the release operation, on the same principle as described above, S(n) of equation (19) determining the amount the lens is driven is substituted for $S(n) + \{S(n) - S(n-1)\} = 2*S(n) - S(n-1)$. The amount the lens is driven X(n) is thus expressed by the following equation:

$$X(n) = \{2*S(n) - S(n-1)\} \\ *(tr - tn + Tr) + D(n) - PD(n) \qquad (23)$$

When the delay time Tr becomes longer than the distance measurement interval, particularly after the release operation, the amount of correction determined by equation (23) is insufficient. In such a case, $\{2*S(n) - S(n-1)\}$ is multiplied by an appropriate attribute $\eta$ (where $\eta > 1$). Thus we have $$X(n) = \eta*\{2*S(n) - S(n-1)\}*(tr - tn + Tr) + D(n) - PD(n) \qquad (24)$$

It is desirable to use a small, extra amount of correction.

The methods described above are easy methods in which the acceleration of the object is approximated to calculate the amount of correction. However, it is possible to calculate the amount of correction using an approximate function, though the calculation becomes complex.

We claim:

1. An automatic focusing device of a camera comprising:
   focusing detecting means for detecting the status of defocus of an image-forming surface and a predetermined image-forming surface formed by a photographing lens so as to intermittently output focus detecting information which indicates the status of defocus;
   memory means for storing a plurality of pieces of focus detecting information calculated by said focus detecting means at predetermined time intervals;
   object position predicting means for detecting the status of an object on the basis of the focus detecting information stored in said memory means so as to predict the position of the object on the basis of an object status signal; and
   lens driving means for driving the photographic lens on the basis of a result predicted by said object position predicting means;
   wherein said object position predicting means predicts the position of the object on the basis of recent focus detecting information and one piece of past focus detecting information other than focus detecting information immediately before said recent focus detecting information, these two pieces of focus detecting information being selected from the plurality of pieces of focus detecting information stored in said memory means.

2. An automatic focusing device of a camera according to claim 1 further comprising:
   light measuring means for metering the light of a focus detecting zone of said focus detecting means; and
   focus detecting information selecting means for selecting the past focus detecting information calculated by said focus detecting means on the basis of a result detected by said light measuring means when the position of the object is predicted.

3. An automatic focusing device of a camera according to claim 1, wherein said focus detecting means has a charge accumulating type photoelectric conversion element, and wherein said object position predicting means varies intervals at which the recent and past focus detecting information used for determining the object status signal is taken, these variations being made in accordance with time during which the charge of said charge accumulating type photoelectric conversion element is accumulated.

4. An automatic focusing device of a camera according to claim 1, wherein said object position predicting means varies the intervals at which the recent and past focus detecting information used for determining the object status signal is taken, these variations being made in accordance with the amount of movement made by the image-forming surface of the photographic lens while the focus detecting information is intermittently taken.

5. An automatic focusing device of a camera according to claim 1, wherein the position of the object indicates an amount in which a predetermined amount α is added to the amount of defocus when the lens is defocused on the basis of the status of defocus at time when focus begins to be detected for retrieving focus detecting information next to the recent focus detecting information.

6. An automatic focusing device of a camera according to claim 1, wherein said object position predicting means includes (a) image surface speed calculating means for calculating the speed at which the image-forming surface formed by the photographic lens moves, corresponding to the object status signal, on the basis of the recent focus detecting information of the plurality of pieces of focus detecting information stored in said memory means, one piece of past focusing detecting information which is taken at least two time intervals earlier than a time interval for taking the recent focus detecting information, time intervals at which the recent and past focus detecting information is taken, and the amount of movement made by the photographic lens at said time intervals, and (b) object determining means for determining that the object is in motion if said image surface speed calculating means exceeds a predetermined threshold value.

7. An automatic focusing device of a camera according to claim 1, wherein said object position predicting means includes object determining means for determining whether the object is at rest or in motion on the basis of two or more records of information regarding the position of the object.

8. An automatic focusing device of a camera according to claim 1, wherein said object position predicting means includes (a) image surface speed calculating means for calculating the speed at which the image-forming surface formed by the photographic lens moves, this calculation being based on the recent focus detecting information of the focus detecting information stored in said memory means, and (b) object determining means for determining whether the object is at rest or in motion on the basis of two or more records of said speed at which the image-forming surface moves.

9. An automatic focusing device of a camera comprising:

focus detecting means for detecting the status of defocus of an image-forming surface and a predetermined image-forming surface formed by a photographic lens so as to intermittently output focus detecting information which indicates the status of defocus;

lens movement detecting means for detecting the amount of movement made by the photographic lens;

memory means for storing a plurality of pieces of focus detecting information calculated by said focus detecting means at predetermined time intervals;

object position predicting means for detecting the status of an object on the basis of the focus detecting information stored in said memory means so as to predict the position of the object of the basis of an object status signal;

lens driving means for driving the photographic lens on the basis of a result predicted by said object position predicting means;

control means for performing the operation of said focus detecting means even while said lens driving means is driving the photographic lens so that a period of the operation overlaps with another period; and wherein said object position predicting means predicts the position of the object on the basis of recent focus detecting information and one piece of past focus detecting information rather than focus detecting information immediately before said recent focus detecting information, these two pieces of focus detecting information being selected from the plurality of pieces of focus detecting information stored in said memory means.

10. An automatic focusing device of a camera according to claim 9, wherein the position of the object indicates the status of defocus at time when focus begins to be detected for retrieving focus detecting information next to the recent focus detecting information.

11. An automatic focusing device of a camera according to claim 9, wherein said focus detecting means has a charge accumulating type photoelectric conversion element, and wherein said object position predicting means varies intervals at which the recent and past focus detecting information used for determining the object status signal is taken, these variations being made in accordance with time during which the charge of said charge accumulating type photoelectric conversion element is accumulated.

12. An automatic focusing device of a camera according to claim 9, wherein said object position predicting means varies the intervals at which the recent and past focus detecting information used for determining the object status signal is taken, these variations being made in accordance with the amount of movement made by the image-forming surface of the photographic lens while the focus detecting information is intermittently taken.

13. An automatic focusing device of a camera according to claim 9, wherein the position of the object indicates an amount in which a predetermined amount α is added to the amount of defocus when the lens is defocused on the basis of the status of defocus at time when focus begins to be detected for retrieving focus detecting information next to the recent focus detecting information.

14. An automatic focusing device of a camera according to claim 9, wherein said object position predicting means includes (a) image surface speed calculating means for calculating the speed at which the image-forming surface formed by the photographic lens moves, corresponding to the object status signal, on the basis of the recent focus detecting information of the plurality of pieces of focus detecting information stored in said memory means, one piece of past focusing detecting information which is taken at least two time intervals earlier than a time interval for taking the recent focus detecting information, time intervals at which the recent and past focus detecting information is taken, and the amount of movement made by the photographic lens at said time intervals, and (b) object determining means for determining that the object is in motion if said image surface speed calculating means exceeds a predetermined threshold value.

15. An automatic focusing device of a camera according to claim 9, wherein said object position predicting means includes object determining means for determining whether the object is at rest or in motion on the basis of two or more records of information regarding the position of the object.

16. An automatic focusing device of a camera according to claim 9, wherein said object position predicting means includes (a) image surface speed calculating means for calculating the speed at which the image-forming surface formed by the photographic lens moves, this calculation being based on the recent focus detecting information of the focus detecting information stored in said memory means, and (b) object determining means for determining whether the object is at rest or in motion on the basis of two or more records of said speed at which the image-forming surface moves.

17. An automatic focusing device of a camera comprising:

focus detecting means for detecting the status of defocus which indicates the amount of deviation between an image-forming surface and a predetermined image-forming surface formed by a photographing lens, and which also indicates a direction in which the deviation occurs so as to intermittently output focus detecting information indicating the status of defocus;

lens movement detecting means for detecting the amount of movement made by the photographic lens;

memory means for storing a plurality of pieces of focus detecting information calculated by said focus detecting means at predetermined time intervals;

object position predicting means for detecting the status of an object on the basis of the focus detecting information stored in said memory means so as to predict the position of the object;

lens driving means for automatically adjusting the photographic lens on the basis of a result predicted by said object position predicting means so that the lens moves to a target position; and control means for performing the operation of said focus detecting means even while said lens driving means is driving the photographic lens so that a period of the operation overlaps with another period;

wherein said object position predicting means predicts the position of the object on the basis of recent focus detecting information and one piece of past focus detecting information other than focus detecting information immediately before said recent focus detecting information, these two pieces of focus detecting information being selected from the plurality of pieces of focus detecting information stored in said memory means, and wherein said object position predicting means includes object determining means which determines that the object is in motion if determinations are made in succession that the records of information regarding the direction in which the deviation occurs are the same a predetermined number of times.

18. An automatic focusing device of a camera comprising:

focus detecting means for detecting the status of defocus which indicates the amount of deviation between an image-forming surface and a predetermined image-forming surface formed by a photographic lens, and which also indicates a direction in which the deviation occurs so as to intermittently output focus detecting information which indicates the status of defocus;

lens movement detecting means for detecting the amount of movement made by the photographic lens;

memory means for storing a plurality of pieces of focus detecting information calculated by said focus detecting means at predetermined time intervals;

object position predicting means for detecting the status of an object on the basis of the focus detecting information stored in said memory means so as to predict the position of the object;

lens driving means for automatically adjusting the photographic lens on the basis of a result predicted by said object position predicting means so that the lens moves to a target position; and control means for performing the operation of said focus detecting means even while said lens driving means is driving the photographic lens so that a period of the operation overlaps with another period;

wherein said object position predicting means includes object determining means which determines that the object is in motion if determinations are made in succession that the records of information regarding the direction in which the deviation occurs are the same a predetermined number of times, and if one piece or a plurality of pieces of information regarding an object status signal is equal to or greater than a threshold value; and wherein said object position predicting means decrease the threshold value once a determination is made that the object is in motion.

19. An automatic focusing device of a camera according to claim 18, wherein said object position predicting means includes image surface speed calculating means which calculates the speed at which the image-forming surface formed by the photographic lens moves, corresponding to the object status signal, this calculation being based on the recent focus detecting information of the plurality of pieces of focus detecting information stored in said memory means, one piece of past focusing detecting information which is taken at least two time intervals earlier than a time interval for the recent focus detecting information, time intervals at which the recent and past focus detecting information is taken, and the amount of movement made by the photographic lens at said time intervals, and wherein said object position predicting means regards information regarding the position of the object as the speed at which the image surface moves.

20. An automatic focusing device of a camera comprising:

focus detecting means for detecting the status of defocus which indicates the amount of deviation between an image-forming surface and a predetermined image-forming surface formed by a photographic lens, and which also indicates a direction in which the deviation occurs so as to intermittently output focus detecting information indicating the status of defocus;

lens movement detecting means for detecting the amount of movement made by the photographic lens;

memory means for storing a plurality of pieces of focus detecting information calculated by said focus detecting means at predetermined time intervals;

object position predicting means for detecting the status of an object on the basis of the focus detecting information stored in said memory means so as to predict the position of the object;

lens driving means for automatically adjusting the photographic lens on the basis of a result predicted by said object position predicting means so that the lens moves to a target position; and control means for performing the operation of said focus detecting means even while said lens driving means is driving the photographic lens so that a period of the operation overlaps with another period;

wherein said object position predicting means includes (a) image surface speed calculating means for calculating the speed at which the image-forming surface formed by the photographic lens moves, corresponding to the object status signal, this calculating being based on the recent focus detecting information and the focus detecting information stored in said memory means, and (b) object determining means for determining the speed at which the photographic lens moves, this determination being based on the amount of movement made by the lens detected by said lens movement detecting means and a time interval at which the information is taken, and said object determining means determines that the object is in motion when the ratio of the speed at which the image surface moves to the speed at which the photographic lens moves exceeds a predetermined value.

21. An automatic focusing device of a camera according to claim 20, wherein once a determination is made that the object is in motion, said object determining means does not use the ratio of the speed at which the image surface moves to the speed at which the photographic lens moves so as to determine whether the object is at rest or in motion.

22. An automatic focusing device of a camera according to claim 20, wherein said object determining means determines that the object is motion when the recent focus detecting information output from said focus detecting means is less than the predetermined threshold value.

23. An automatic focusing device of a camera according to claim 20, wherein said object determining means determines that the object is in motion if a determination is made that the recent focus detecting information output from said focus detecting means is less than a first predetermined threshold value, and once a determination is made that the object is in motion, said object determining means determines that the object is at rest if a determination is made that the recent focus detecting information is greater than a second threshold value which is greater than the first threshold value.

24. An automatic focusing device of a camera comprising:

focus detecting means having a charge accumulating type photoelectric conversion element which detects the status of defocus on the basis of the output of the charge accumulating type photoelectric conversion element, which status of defocus indicates the amount of deviation between an image-forming surface and a predetermined image-forming surface formed by a photographing lens, said status of defocus also indicating a direction in which the deviation occurs so as to intermittently output focus detecting information indicating the status of defocus;

lens movement detecting means for detecting the amount of movement made by the photographic lens;

memory means for storing a plurality of pieces of focus detecting information calculated by said focus detecting means at predetermined time intervals;

object position predicting means for detecting the status of an object on the basis of the focus detecting information stored in said memory means so as to predict the position of the object of the basis of an object status signal;

lens driving means for automatically adjusting the photographic lens on the basis of a result predicted by said object position predicting means so that the lens moves to a target position;

control means for performing the operation of said focus detecting means even while said lens driving means is driving the photographic lens so that a period of the operation overlaps with another period; and lens drive amount calculating means for permitting a shutter release signal at any time so as to calculate, upon detection of the release signal, the amount the lens is driven so that the photographic lens is focused at the time of exposure, this calculation being based on the object status signal and delay time required until exposure is actually made;

wherein said object position predicting means calculates the speed at which the image-forming surface formed by the photographic lens moves, this calculation being based on recent focus detecting information and one piece of past focus detecting information other than focus detecting information immediately before said recent focus detecting information, these two pieces of focus detecting information being selected from the plurality of pieces of focus detecting information stored in said memory means.

25. An automatic focusing device of a camera according to claim 24, wherein upon detection of the release signal, said lens drive amount calculating means calculates the amount the lens is driven on the basis of a recent speed at which the image surface moves, time elapsed between when the charge of the focus detecting information used for calculating said recent speed is accumulated and when the release signal is detected, the amount of movement made by the photographic lens during the elapsed time, and predetermined delay time between when the release signal is detected and when exposure is actually made so that the photographic lens is focused at the time of exposure.

26. An automatic focusing device of a camera according to claim 24, further comprising adjustable speed calculating means for calculating an increase or decrease in the speed at which the image surface moves, this calculation being based on the records of the speed at which the image surface moves detected by said object position predicting means when the release signal is detected, wherein said lens drive amount calculating means corrects the amount the lens is driven, this correction being based on the increase or decrease determined by said adjustable speed calculating means.

* * * * *